(12) United States Patent
Simmons et al.

(10) Patent No.: US 9,859,561 B2
(45) Date of Patent: Jan. 2, 2018

(54) HIGH-PERFORMANCE CATHODE MATERIALS FOR LITHIUM SULFUR BATTERIES FROM LIGNOSULFONATE

(71) Applicant: RENSSELAER POLYTECHNIC INSTITUTE, Troy, NY (US)

(72) Inventors: Trevor Simmons, Rhinebeck, NY (US); Rahul Mukherjee, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 15/028,503

(22) PCT Filed: Oct. 14, 2014

(86) PCT No.: PCT/US2014/060408
§ 371 (c)(1),
(2) Date: Apr. 11, 2016

(87) PCT Pub. No.: WO2015/057652
PCT Pub. Date: Apr. 23, 2015

(65) Prior Publication Data
US 2016/0240853 A1    Aug. 18, 2016

Related U.S. Application Data

(60) Provisional application No. 61/890,355, filed on Oct. 14, 2013.

(51) Int. Cl.
*H01M 4/583* (2010.01)
*H01M 4/133* (2010.01)
(Continued)

(52) U.S. Cl.
CPC ............. *H01M 4/60* (2013.01); *C01B 32/05* (2017.08); *H01M 4/0471* (2013.01);
(Continued)

(58) Field of Classification Search
CPC .............................. H01M 4/133; H01M 4/583
See application file for complete search history.

(56) References Cited

U.S. PATENT DOCUMENTS

| 3,811,947 A | 5/1974 | Metcalfe, III et al. |
| 4,143,217 A | 3/1979 | Joo et al. |

(Continued)

FOREIGN PATENT DOCUMENTS

JP    10-064546 A    3/1998

OTHER PUBLICATIONS

Milczarek et al. (Science, Mar. 23, 2012 vol. 335, (6075), 1468-1471).*

(Continued)

*Primary Examiner* — Olatunji Godo
(74) *Attorney, Agent, or Firm* — Foley & Lardner LLP

(57) ABSTRACT

Methods of making cathodes for lithium-sulfur batteries are disclosed, in addition to cathodes and batteries containing the cathodes. A method of making a cathode is disclosed which includes extracting lignosulfonate from brown liquor, pyrolyzing the lignosulfonate, carbonizing the pyrolyzed lignosulfonate to form a carbon-sulfur compound, and forming the carbon-sulfur compound into a cathode. A cathode for a lithium-sulfur battery is disclosed which includes pyrolized lignosulfonate recovered from brown liquor, and carbon. The pyrolyzed lignosulfonate and carbon are suspended in a matrix having a substantially homogenous distribution of sulfur. A battery is disclosed in which an anode including an electrolye, lithium, is provided along with a membrane separate and a carbon comprising a carbon-sulfur compound derived from lignosulfonates.

10 Claims, 31 Drawing Sheets

(51) Int. Cl.
    *H01M 4/60*         (2006.01)
    *H01M 4/58*         (2010.01)
    *H01M 10/052*     (2010.01)
    *H01M 4/04*         (2006.01)
    *H01M 10/0525*    (2010.01)
    *H01M 4/136*       (2010.01)
    *H01M 4/1397*     (2010.01)
    *C01B 32/05*       (2017.01)
    *H01M 4/62*         (2006.01)
    *H01M 4/02*         (2006.01)

(52) U.S. Cl.
    CPC ......... *H01M 4/136* (2013.01); *H01M 4/1397* (2013.01); *H01M 4/58* (2013.01); *H01M 4/581* (2013.01); *H01M 4/5815* (2013.01); *H01M 4/625* (2013.01); *H01M 10/052* (2013.01); *H01M 10/0525* (2013.01); *H01M 4/623* (2013.01); *H01M 2004/027* (2013.01); *H01M 2004/028* (2013.01)

(56) References Cited

U.S. PATENT DOCUMENTS

| | | | |
|---|---|---|---|
| 6,099,990 A * | 8/2000 | Denton, III | H01M 4/583 423/447.5 |
| 2003/0113624 A1 | 6/2003 | Kim et al. | |
| 2011/0052998 A1 | 3/2011 | Liang et al. | |

OTHER PUBLICATIONS

He et al., "Fabrication, characterization and application of nitrogen-containing carbon nanospheres obtained by pyrolysis of lignosulfonate/poly(2-ethylaniline)," Bioresource Technology, 2013 (online Oct. 16, 2012), 127:66-71.

Levon et al., "Electrically conducting compound synthesized from lignin and sulfur," Polymer Bulletin, 1986, 16:433-439.

Pan et al., "Natural graphite modified with nitrophenyl multilayers as anode materials for lithium ion batteries," Journal of Materials Chemistry, 2007 (online Nov. 2, 2006), 17:329-334.

* cited by examiner

HIGH-PERFORMANCE CATHODE MATERIALS FOR LITHIUM SULFUR BATTERIES FROM LIGNOSULFONATE

CROSS-REFERENCE TO RELATED APPLICATIONS

This disclosure claims the benefit of priority of U.S. Provisional Application No. 61/890,355, filed on Oct. 14, 2013, entitled "High-performance cathode materials for lithium sulfur batteries from lignosulfonate".

FIELD OF THE INVENTION

The present invention generally relates to cathode materials for lithium sulfur batteries.

BACKGROUND OF THE INVENTION

While rechargeable batteries are well recognized for the vital role they play in mobile communications, rechargeable batteries may also be a potential replacement for conventional combustion engines in a variety of electric vehicles, including automobiles, airplanes, and boats. The U.S. Department of Energy's proposed roadmap for rechargeable batteries recommends a ten-fold rise in energy density, from 150 Watt-hours per kilogram (Wh/kg) to 3,000 Wh/kg. The roadmap further recommends a one-third reduction in the price per kilowatt hour (kWh) (from \$300/kWh to \$100/kWh) of the battery, with the improvements in density and cost-savings to be realized by 2020.

SUMMARY

In one embodiment, a method of making a cathode includes extracting lignosulfonate from brown liquor; pyrolyzing the lignosulfonate; carbonizing the pyrolyzed lignosulfonate to form a carbon-sulfur compound; and forming the carbon-sulfur compound into a cathode.

In one embodiment, a battery includes an anode comprising lithium, a lithium containing anode, an electrolyte, a membrane separator, and a cathode comprising a carbon-sulfur compound derived from lignosulfonates.

In one embodiment, a cathode for a lithium-sulfur battery includes pyrolized lignosulfonate recovered from brown liquor, and carbon, wherein the pyrolyzed lignosulfonate and carbon are suspended in a matrix having a substantially homogenous distribution of sulfur.

Additional features, advantages, and embodiments of the present disclosure are apparent from consideration of the following detailed description, drawings, and claims. Moreover, it is to be understood that both the foregoing summary of the present disclosure and the following detailed description are exemplary and intended to provide further explanation without limiting the scope of the present disclosure and the claims.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
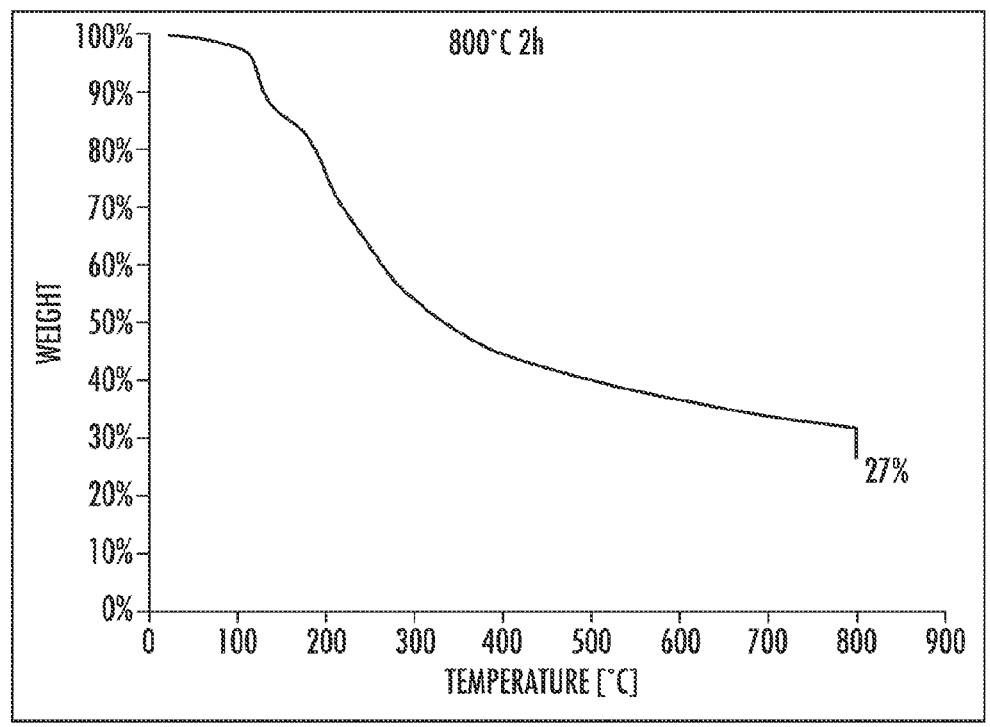
FIG. 1(a) depicts the solids mass loss of brown liquor during heating to 800° C. for two hours under 90 mL/min ultra-high purity nitrogen flow.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Existing batteries suffer from performance deficiencies, for example, they have limited power density and may drain rapidly when used for certain applications. One type of rechargeable battery is the familiar lithium-ion (Li-ion) battery, widely used in portable devices. As an alternative, lithium-sulfur (Li—S) batteries have been proposed. Li—S batteries have demonstrated an achievable energy density of approximately 500-600 Wh/kg, which is significantly greater than the densities of commercial Li-ion and nickel metal hydride batteries (150-200 Wh/kg), nickel cadmium batteries (40-60 Wh/kg) and lead-acid batteries (30-40 Wh/kg).

Figure 23:
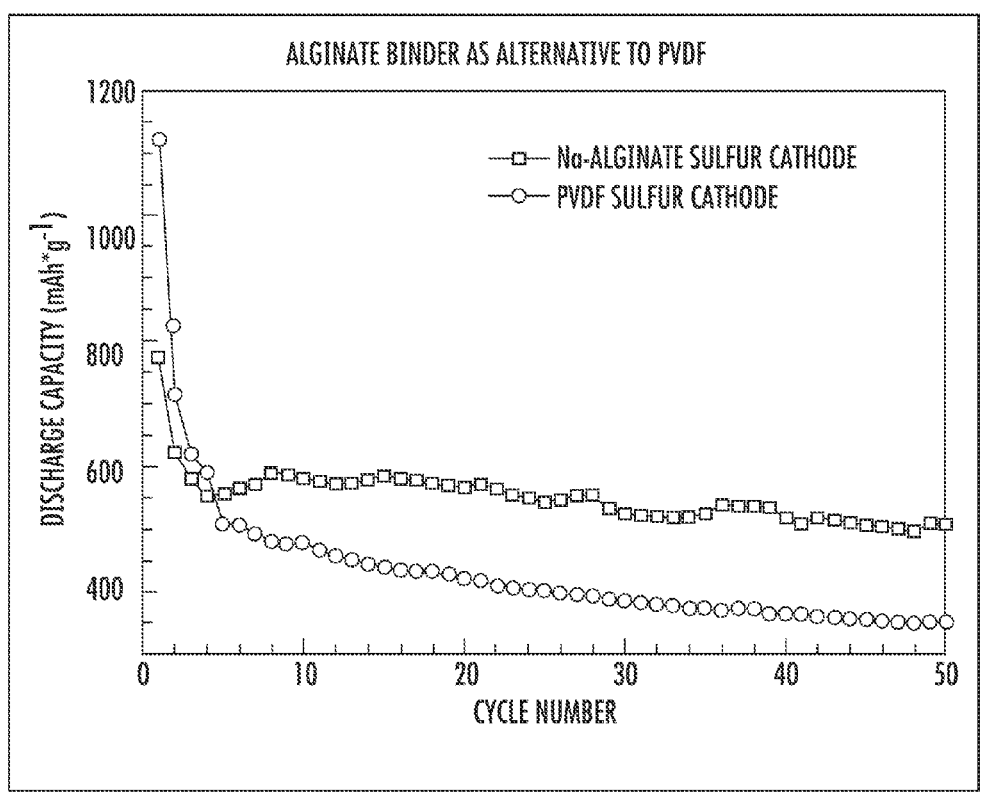
FIG. 23 depicts discharge characteristics of two sulfur cathode materials.
Figure 24A:
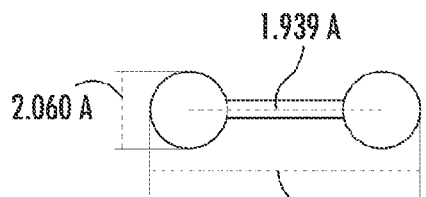
FIGS. 24(a)-(g) depict the relative sizes of S allotropes.
Figure 24B:
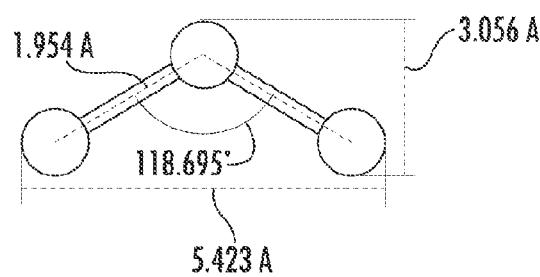
Figure 24C:
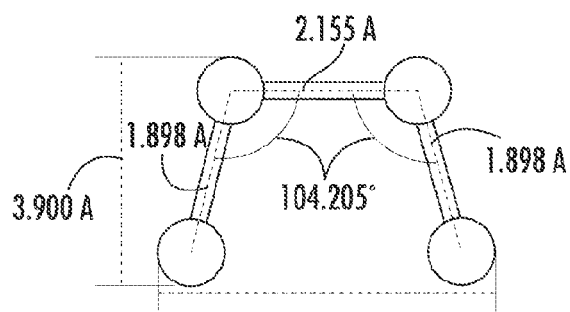
Figure 24D:
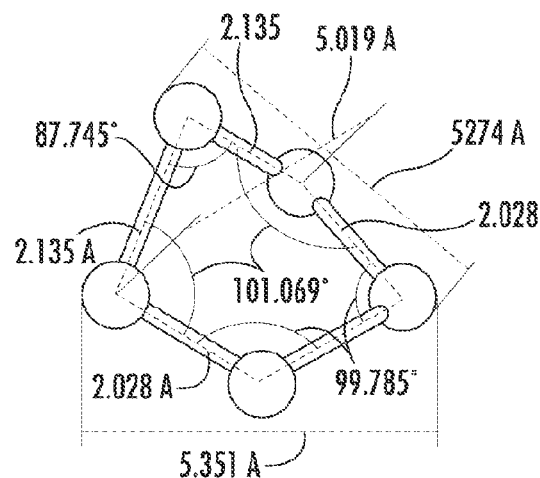
Figure 24E:
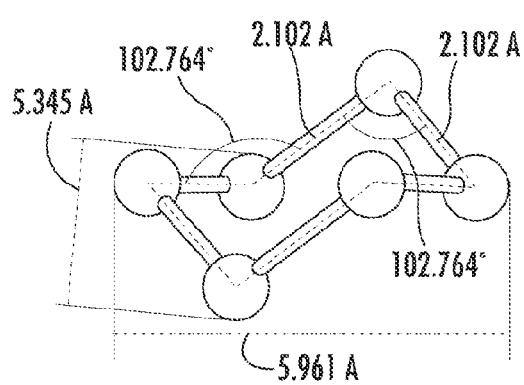
Figure 24F:
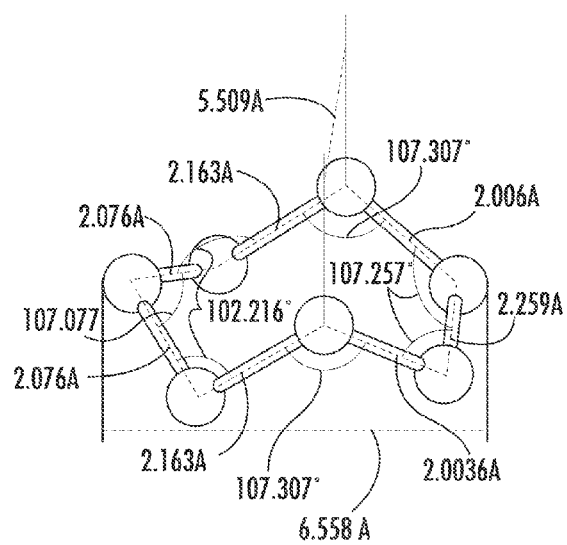
Figure 24G:
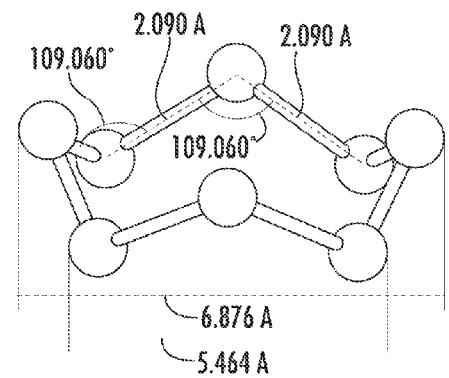

Li—S batteries are rechargeable secondary batteries with a theoretical gravimetric capacity of 1.67 Ah/g and an energy density of 2.6 kWh/kg and a theoretical volumetric energy density of 2800 Wh/L, based on the lithium-sulfur redox couple. The primary difference between Li—S and Li-ion batteries is that the former contains sulfur in the cathode. When a Li—S battery is discharged, lithium ions are inserted into the cathode material. Subsequently, lithium ions react with the sulfur content in the cathode, resulting in the formation of $Li_2S$. In other words, a single atom of sulfur can accommodate as many as 2 atoms of lithium. FIG. 23 depicts discharge characteristics of two sulfur cathode materials, a sodium alginate cathode material and a PVDF sulfur cathode material (adapted from Journal of Energy Chemistry 22 (2013) 790-794). The sodium alginate was developed as a binder and represents an alternative to PVDF. PVDF can only be used with the solvent n-methylpyrrolidone (NMP). Alginate allows the material to be formed into a cathode with water as the solvent. Additionally, PVDF is a synthetic fluoropolymer whereas alginate is a renewable biopolymer from algae.

Figure 17:
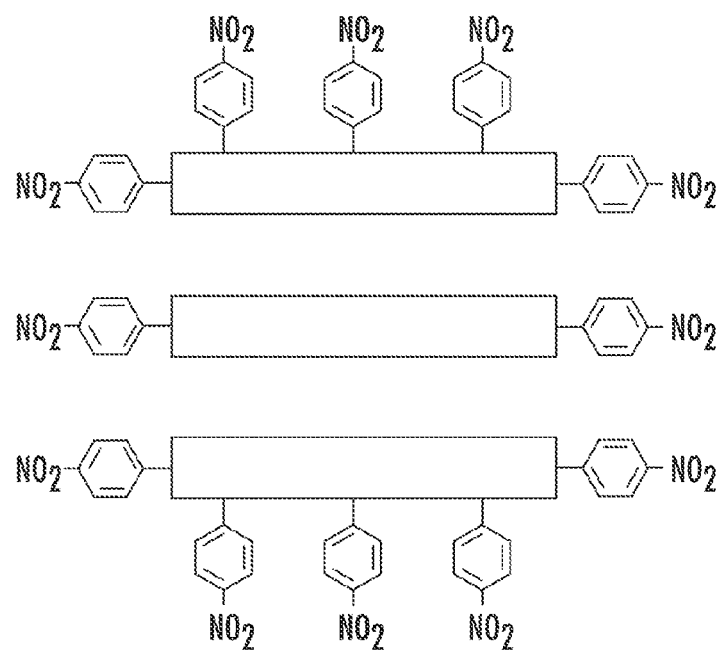
FIG. 17 depicts natural graphite modified with nitrophenyl multilayers.
Figure 18A:
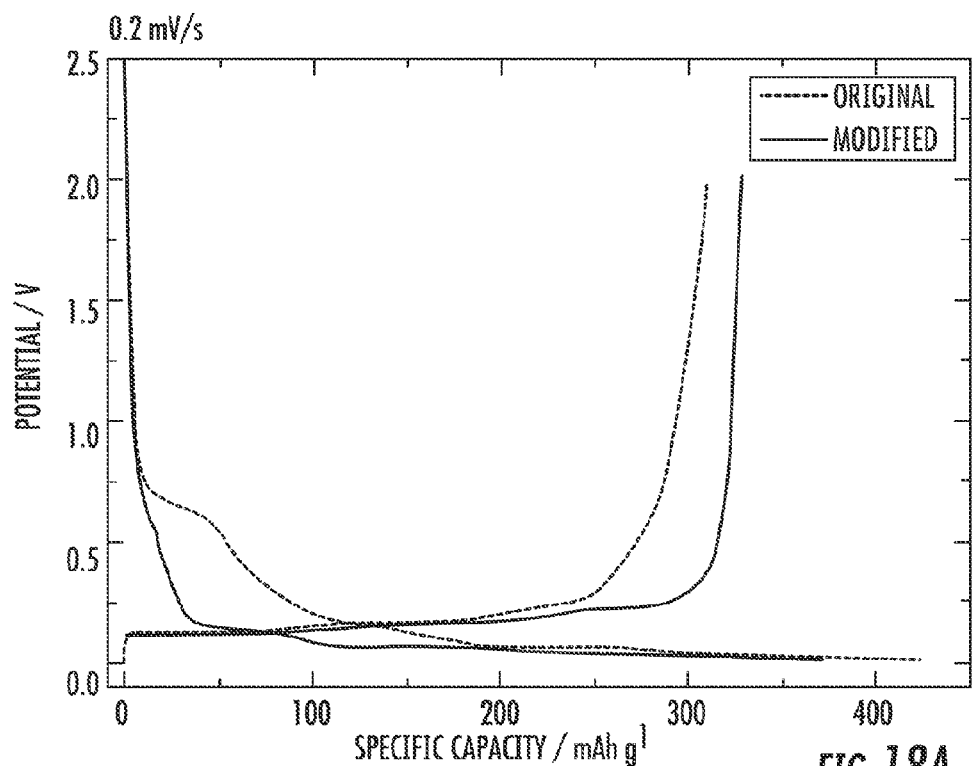
FIGS. 18(a)-(b) depict electrochemical behavior for nitrophenyl groups.
Figure 18B:
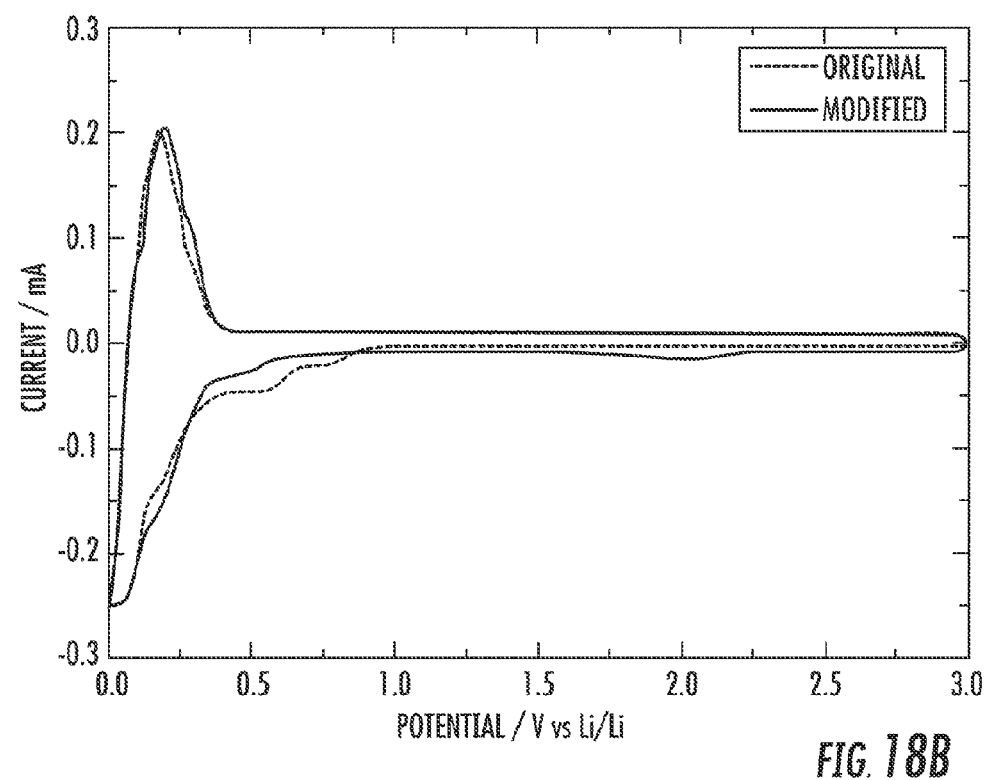

By employing sulfur in their cathodes, Li—S batteries can realize substantially greater energy densities than existing energy storage devices. In this regard, Li—S batteries represent a significant improvement over conventional Li-ion batteries with graphitic anodes, which can accommodate only approximately 0.17 atoms of lithium per atom of carbon. FIG. 17 depicts natural graphite modified with nitrophenyl multilayers as an anode material for Li-ion batteries (adapted from Qinmin Pan, Hongbo Wang and Yinghua Jiang, J. Mater. Chem., 2007, 17, 329-334). FIGS. 18(a)-(b) depict electrochemical behavior for nitrophenyl groups, with FIG. 18(a) illustrating potential versus specific capacity and FIG. 18(b) illustrating current versus potential. The electrochemical behavior of materials produced via argon flow techniques according to at least some of the embodiments may be comparable. Further, such materials may have phenylcyano groups that achieve comparable or identical voltage windows.

Sulfur by itself is not a suitable electrode material due to its poor conductivity. Cathode materials for rechargeable secondary batteries such as Li—S batteries may contain carbon as an amorphous conductive material, which is predominantly synthesized by the incomplete combustion of petroleum byproducts. Sulfur cathodes require the addition of this conductive carbon material to improve their conductivity. Carbon black, for example, may be added in order to obtain a substantial increase in the electrical conductivity of sulfur from its typical level ($S \approx 5 \times 10^{-16}$ S/m at 20° C., $C \approx 2 \times 10^3$ S/m at 20° C.).

Although polymethyl methacrylate (PMMA) silica based templates may be used to deposit carbon sulfur material in order to achieve porosity within a cathode structure, such approaches have disadvantages with respect to both cost and time. The porosity may be achieved via post-deposition etching of the template using hydrofluoric acid, which is extremely strong and requires careful handling. The necessitation of multiple processes and utilization of a large number of chemicals to (a) prepare the template from silica or PMMA, for example, (b) deposit the active material (e.g., resol, tetraethylorthosilicate and a block polymer, or pluronic F127) and (c) etch the template with the hydrofluoric acid contribute to a substantial rise in the cost and complexity of electrode synthesis. The cost and complexity associated with the use of PMMA silica based templates are consistent with findings by the U.S. Department of Energy that as much as 25% of the cost of a battery is linked to electrode manufacturing.

Further, the polysulfide electrochemistry of Li—S batteries provides a high energy density and an overcharge protection mechanism, where the sulfur shuttle mechanism shunts the charge current and prevents overcharge. However, the electrochemical make-up of Li—S batteries presents a significant challenge due to the susceptibility of the sulfur to substantial dissolution into the electrolyte from within the conductive carbon matrix of the cathode. The dissolution of the polysulfides is extremely detrimental to the performance of Li—S batteries. The loss of polysulfides directly translates to a rapid fading of capacity due to a decrease in the active material, lower Coulombic efficiencies, electrolyte degradation due to undesired side reactions, and eventually, a poor cycle life. Encapsulating these polysulfides within the conductive carbon matrix of the cathode may prevent the loss of performance characteristics and avoid the aforementioned drawbacks.

In view of the foregoing, a synthesized Li—S cathode material should preferably permit encapsulation or allow for another mechanism to prevent the release of sulfur into the electrolyte of a Li—S battery. Additionally, the Li—S cathode material should preferably have a large amount of sulfur to allow for a higher capacity. Further, the cathode material should possess sufficient graphitic carbon content to provide electrical conductivity, and should not require complicated processes that increase material costs.

Lignosulfonate (sulfonated lignin) liquor is one source of sulfur to be employed in the cathodes of Li—S batteries. Lignosulfonate derives from lignin, a naturally occurring biopolymer that is a major component of wood. Lignin is a complex polymer of aromatic alcohols (monolignols) that is an integral part of the secondary cell walls of plants. The composition of lignin varies from species to species. Table 1 below lists a typical composition of brown liquor from acid sulfite pulping of Norway spruce. Extracting lignin from wood pulp via a sulfite process used in the paper industry yields lignosulfonate. In typical wood processing applications, extracted lignin is part of the waste stream. The spent cooking liquor from the sulfite process is known to those in the art as 'brown liquor.'

TABLE 1

Composition of Brown Liquor from Norway Spruce[1]

| COMPONENT | CONTENT (% WT. OF DRY SOLIDS) |
|---|---|
| LIGNOSULFONATES | 55 |
| CARBOHYDRATES (Mon.Xvl.Gol.Glu). | 28 |
| ALDONIC ACIDS | 5 |
| ACETIC ACID | 4 |
| EXTRACTIVES | 4 |
| OTHER | 4 |

[1]Adapted from *Wood Chemistry: Fundamentals and Applications* by Eero Sjöström.

Figure 22:
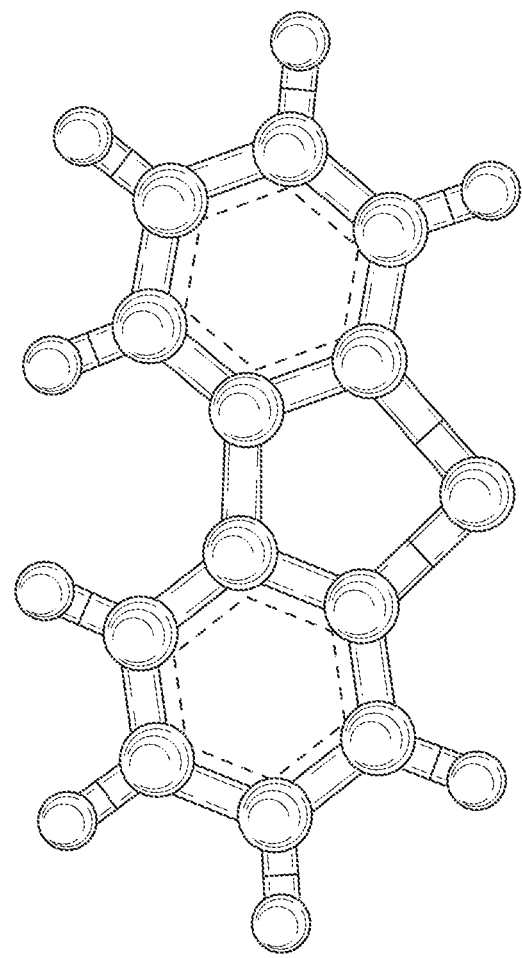
FIG. 22 depicts a dibenzothiophenes (DBT) structure.

Lignosulfonates may be recovered from spent pulping liquids via a variety of industrial processes, including the Howard process. Techniques such as ultrafiltration and ion exchange may be used to separate lignosulfonates from spent pulping liquid. Other potential sources of sulfur may include high sulfur coke with 5-10% wt sulfur or dibenzothiophenes. FIG. 22 depicts a dibenzothiophenes (DBT) structure. Reduction with lithium results in scission of one C—S bond, and S-oxidation occurs to yield sulfone.

Figure 8:
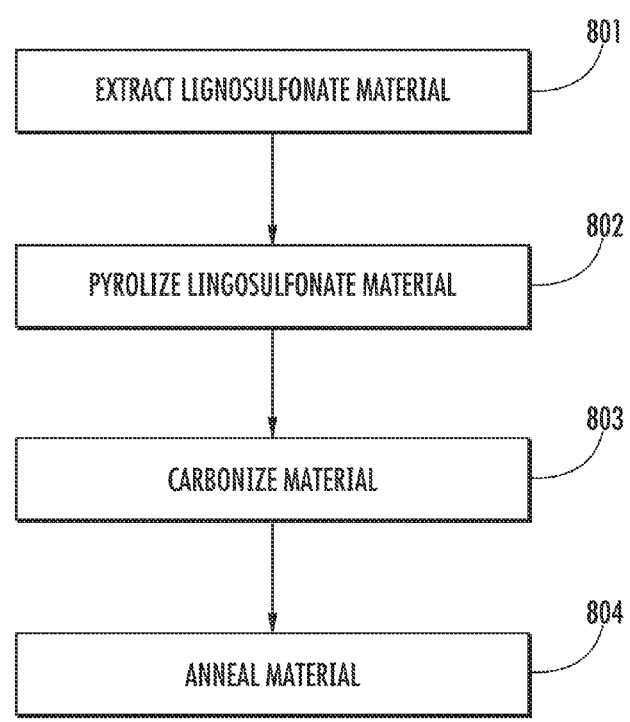
FIG. 8 is a flowchart illustrating a conversion process.

In at least one embodiment, lignosulfonate is converted to a high-performance cathode material for Li—S batteries via heat treatment. FIG. 8 is a flowchart illustrating a conversion process 800 according to an embodiment. As shown in FIG. 8, the process 800 entails extraction, pyrolysis, carbonization, and annealing, as described below in more detail. Lignosulfonates are an ideal precursor to form conductive carbon cathodes that contain active sulfur in small clusters, which is an essential characteristic for Li—S batteries to maintain long cycle lifetimes. Further, lignosulfonates are a low-cost byproduct stream.

In at least one embodiment, the conversion process 800 may begin by extracting the lignin via sulfite processing, as mentioned above (801). The spent brown liquor containing lignosulfonates is dehydrated by heating for several hours at 80° C. The resulting sulfonated polyphenol, which has a complex structure, is then pyrolyzed in a non-reactive gas, such as nitrogen or argon (802). The pyrolysis results primarily in the loss of water and the formation of a high surface area carbon-sulfur material. Quantities of carbon, sulfur, and impurities are also lost during pyrolysis, resulting in a mass loss of approximately 50%. The thermal treatment then begins with a carbonizing process (803).

In one embodiment, the carbonization process involves ramping up from room temperature to 300° C. at 20° C./min. In another embodiment, the carbonization process entails increasing the temperature to 800° C. and maintaining this temperature for two hours. The carbonizing process results in the material becoming an amorphous carbon-sulfur material with no measurable conductivity. Subsequent annealing ramps the temperature up from 300° C. to 800° C. at 20° C./min, and the material remains isothermal for up to 8 hours (804). During this time, the material becomes electrically conductive, and loses any remaining oxygen groups in the form of $CO_x$ and $SO_x$ gas. In another embodiment the temperature is ramped to 300° C., maintained for 1 hour to form the initial charred carbon structure, ramped to 800° C., maintained for 3 hours to achieve electrical conductivity through rearrangement of carbon-carbon bonds, ramped down to 100° C., and then ramped to 155° C. and held isothermal for 16 hours to infiltrate the sulfur into the carbon matrix. This material is then crushed and milled into a fine powder, which is combined with a polymeric binder and conductive carbon additives if needed. This material is added to water or similar solvent and deposited on a substrate, and then dried for use in a Li—S cell. The lignosulfonate liquor extracted via the process shown in FIG. 8 produces a thick, viscous, nearly solid material when dried. Pyrolysis of the material in an inert atmosphere, and annealing allows for a dense, conductive material in which the sulfur is suitably infiltrated.

Figure 1B:
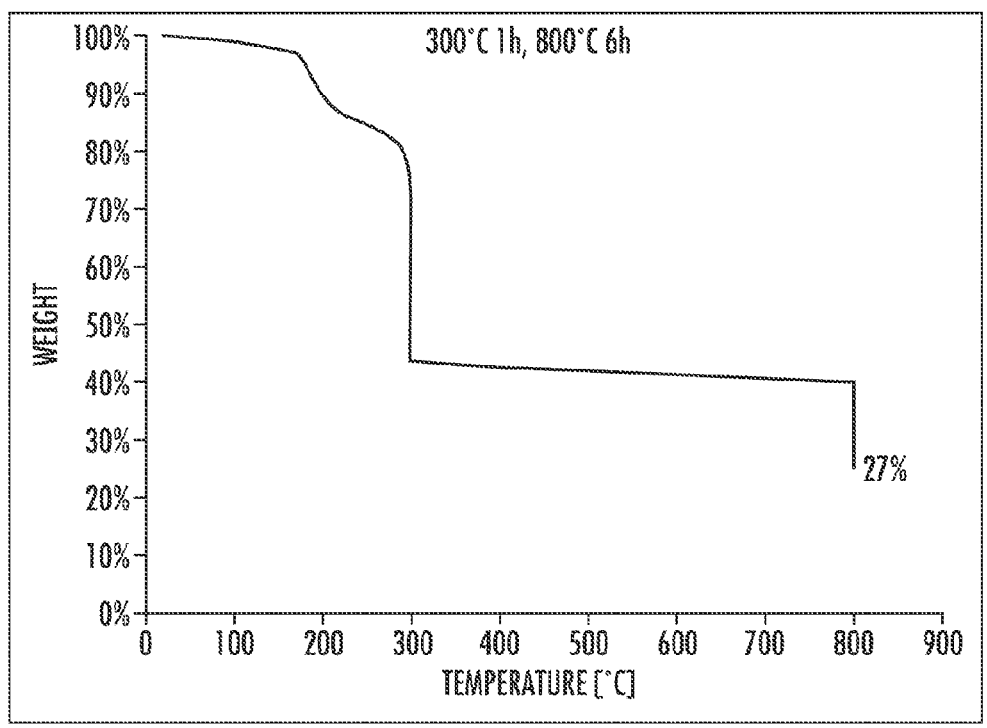
FIG. 1(b) depicts the solids mass loss of brown liquor during heating to 300° C. for one hour followed by heating to 800° C. for up to six hours, under 90 mL/min ultra-high purity nitrogen flow.

In some embodiments, the heat treatment of brown liquor is calibrated based on a total processing time. In other embodiments, the heat treatment is calibrated based on a desired temperature profile. In still other embodiments, the heat treatment is calibrated based on at least one of the time and the temperature. Representative heat treatment processes are shown in FIGS. 1(a) and 1(b). FIG. 1(a) is a plot of the solids mass loss of brown liquor during heating to 800° C. for two hours under 90 mL/min ultra-high purity nitrogen flow. FIG. 1(b) is a plot of the solids mass loss of brown liquor during heat treatment to 300° C. that was held isothermal for one hour and then 800° C. for six hours, under 90 mL/min ultra-high purity nitrogen flow. As indicated by both FIGS. 1(a) and 1(b), more than 50% of the solids mass is lost. FIGS. 1(a)-(b) represent the results of thermogravimetric analyses (TGA) of lignosulfonate material from the Aldrich Chemical Corporation, which served as a benchmark precursor. FIG. 1(a) indicates that as the material is heated in a flowing nitrogen atmosphere, it first loses residual moisture and then volatile compounds. The material begins carbonizing (losing most of all other elements) at about 300° C. The residual mass is shown in percentages. Each treatment regime resulted in the same observed residual mass of 27%.

At least some of the aforementioned embodiments were evaluated with respect to an off-the-shelf lignosulfonate standard. Specifically, the lignosulfonates derived from brown liquor were compared to desulfonated Kraft lignin, i.e., lignin produced by the Kraft process. Desulfonated Kraft lignin is a starting material that is lower in molecular weight than its brown liquor counterpart, and was used as a benchmark during experimentation. The desulfonated Kraft lignin has a lower sulfur content than its brown liquor counterpart.

Figure 11:
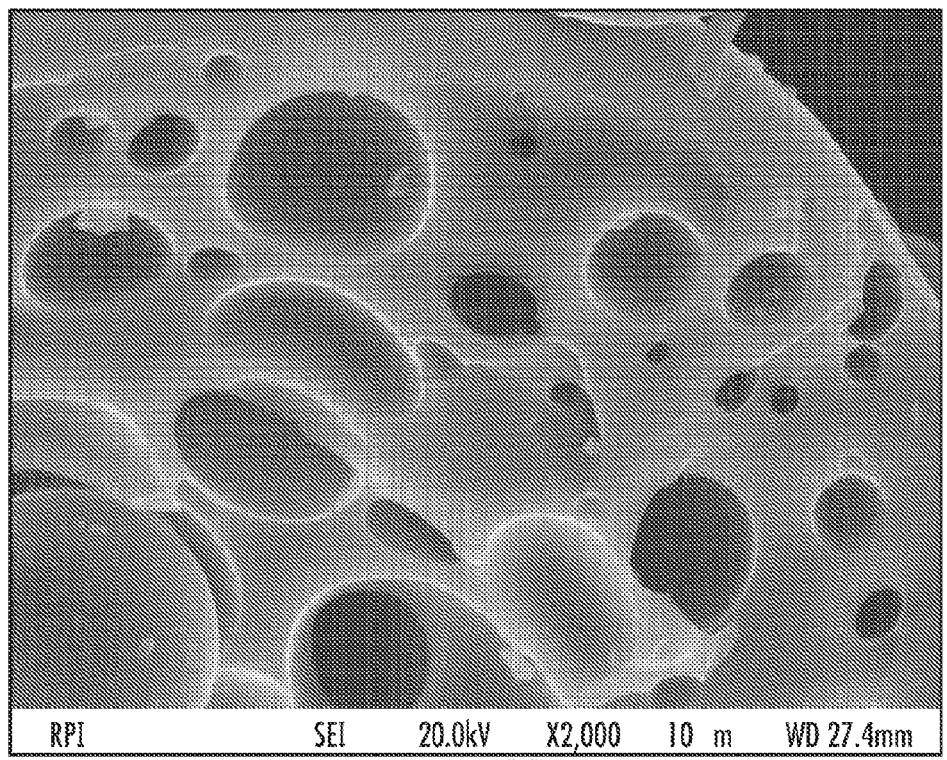
FIG. 11 is an SEM image of desulfonated Kraft lignin after pyrolysis.
Figure 12:
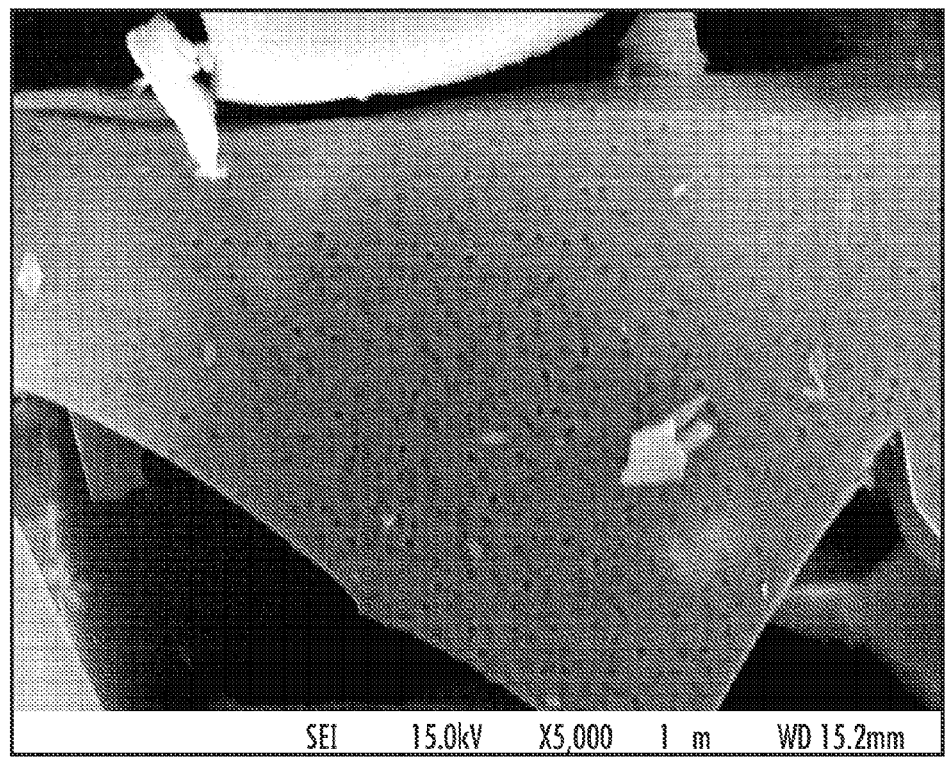
FIG. 12 is an SEM image of lignosulfonate produced according to an embodiment.
Figure 16:
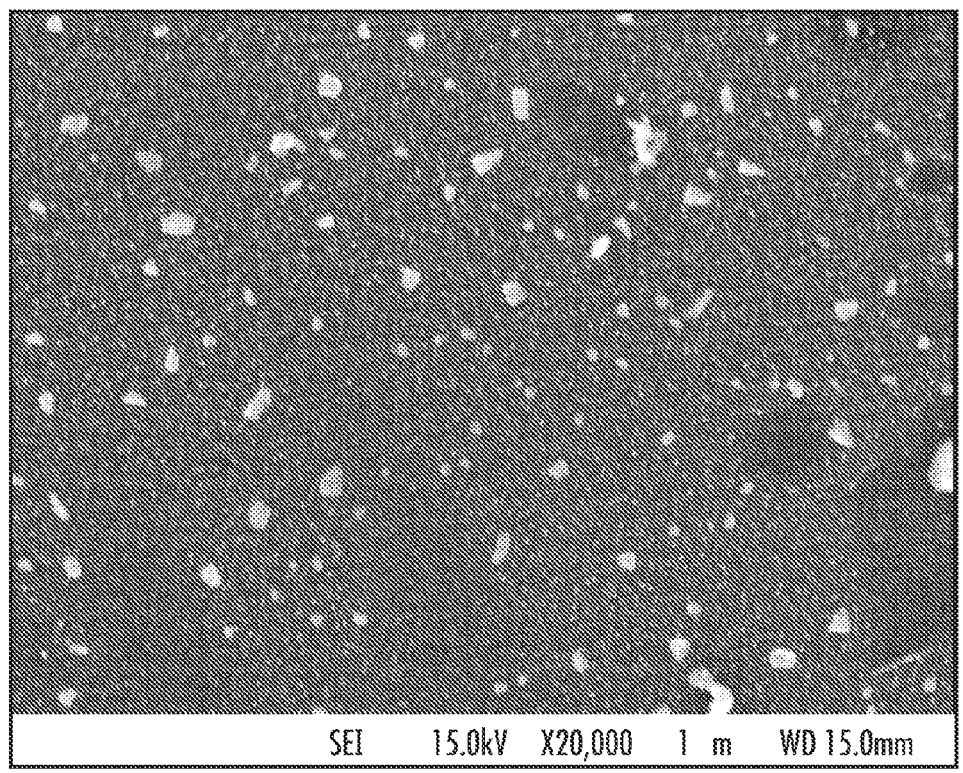
FIG. 16 depicts a scanning electron micrograph of potassium salt particles observed on pyrolyzed liquor.

FIG. 11 is an SEM image indicating the macroscopic porosity of desulfonated Kraft lignin, treated with indulin, and following pyrolysis. FIG. 12 is an SEM image indicating the nanoscopic porosity of lignosulfonate produced according to an embodiment. The small white particles shown in FIG. 12 are likely potassium salts. The nanoscale porosity is important for allowing for diffusion of lithium in and out of the material during cycling. FIG. 16 depicts a scanning electron micrograph of potassium salt particles observed on pyrolyzed liquor.

Figure 19:
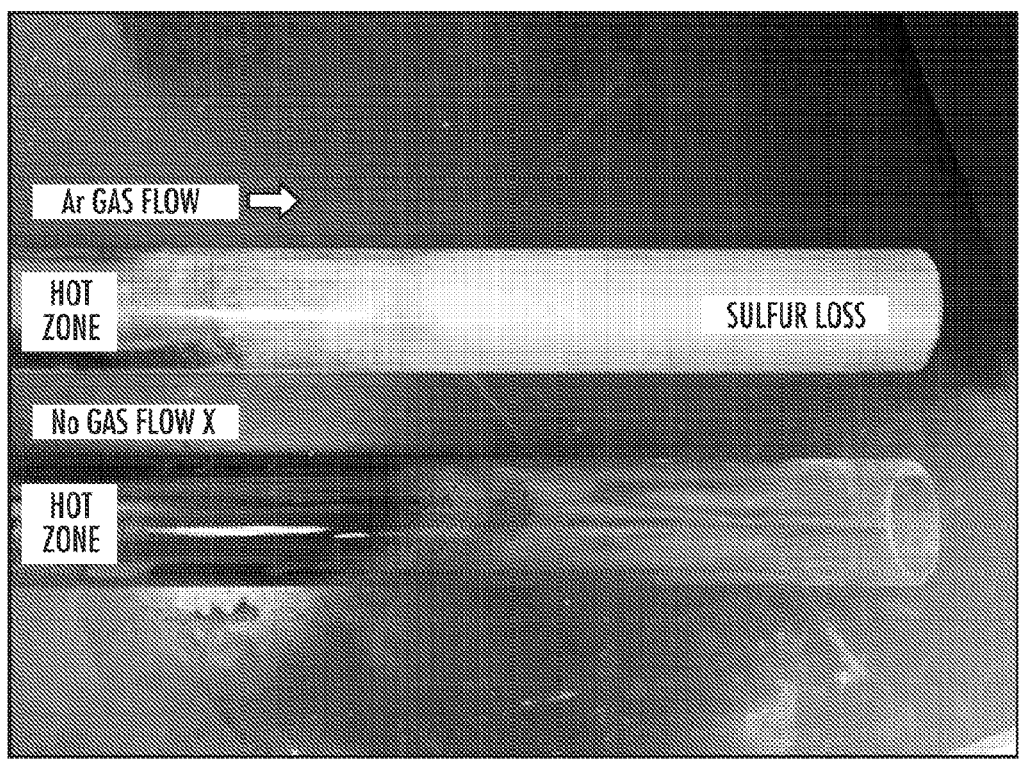
FIG. 19 depicts the downstream end of a reaction tube.

FIG. 19 depicts the downstream end of a reaction furnace tube. Conducting the reaction with an argon (Ar) gas flow may cause much of the sulfur, which is generally yellowish-white, to be lost from the material. In contrast, the same pyrolysis method, with a static argon blanket rather than an argon flow, resulted in no observable sulfur loss. The resulting material showed substantially stronger sulfur peaks in both EDX and XPS analyses. Batteries made with this material also exhibited the expected open circuit voltage of approximately 2.4-3.0 V. The material from the argon flow method showed an unexpected open circuit voltage (OCV) of approximately 500 mV.

Figure 20:
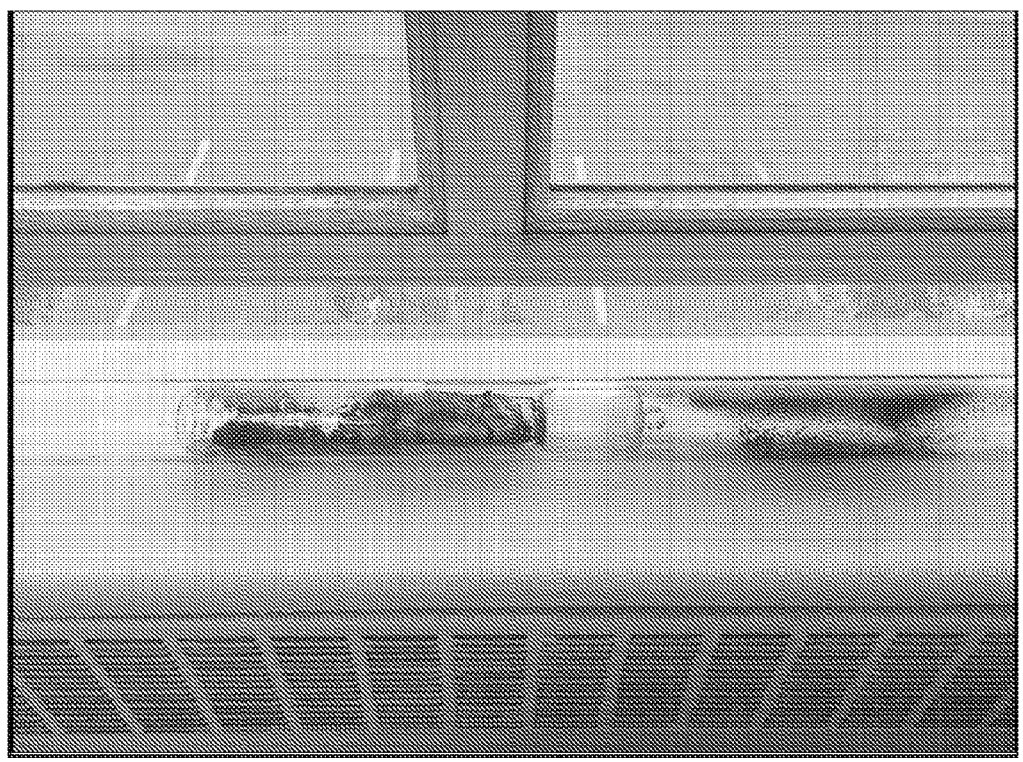
FIG. 20 depicts pyrolyzed material in a reaction tube after treatment including a static argon blanket and a long soak.

FIG. 20 depicts pyrolyzed material in a reaction tube that employed the static argon blanket and a long soak at low temperature (155° C.). No sulfur loss was observed, and the reaction zone was observed to be relatively clean, without yellow sulfur. Visual observation of the reaction tube indicated that the sulfur has been fully infiltrated into the material. Quartz blocks partially obstruct the tube reducing gas (argon, oxygen, C, water, sulfur) loss during pyrolysis. Significant water was found in the bottom the tube after pyrolysis, in the clod zone at the end of the tube.

Figure 21A:
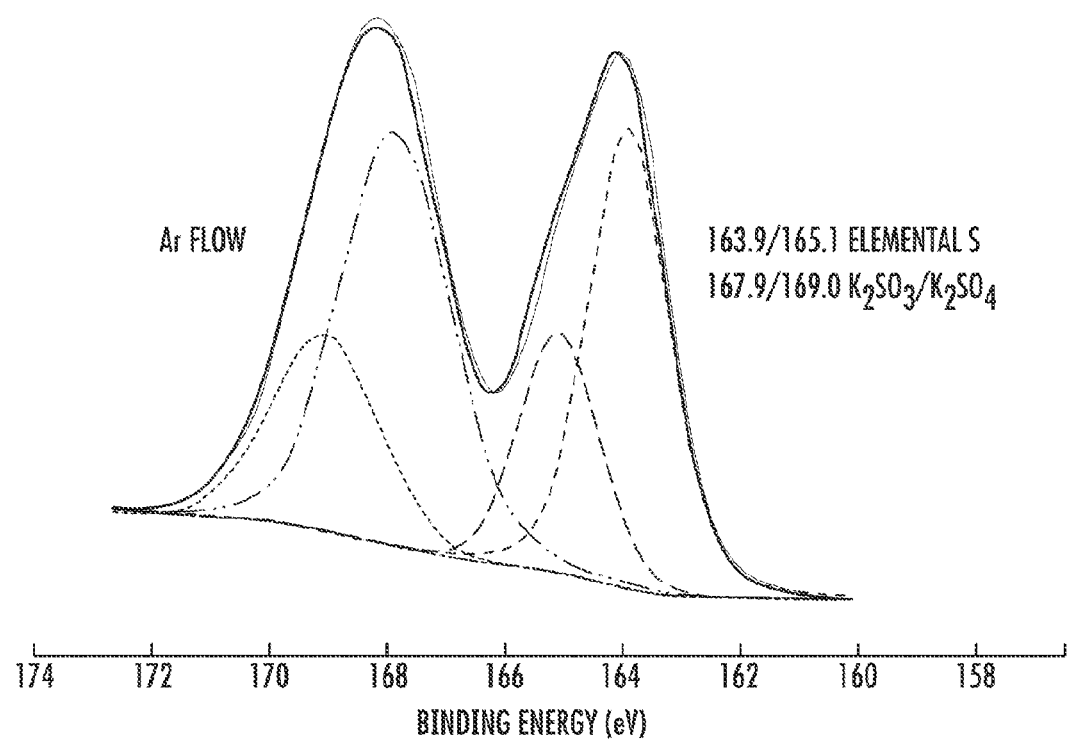
FIGS. 21(a) and (b) depict electrochemical behavior for samples subjected to flowing and static Ar blankets.
Figure 21B:
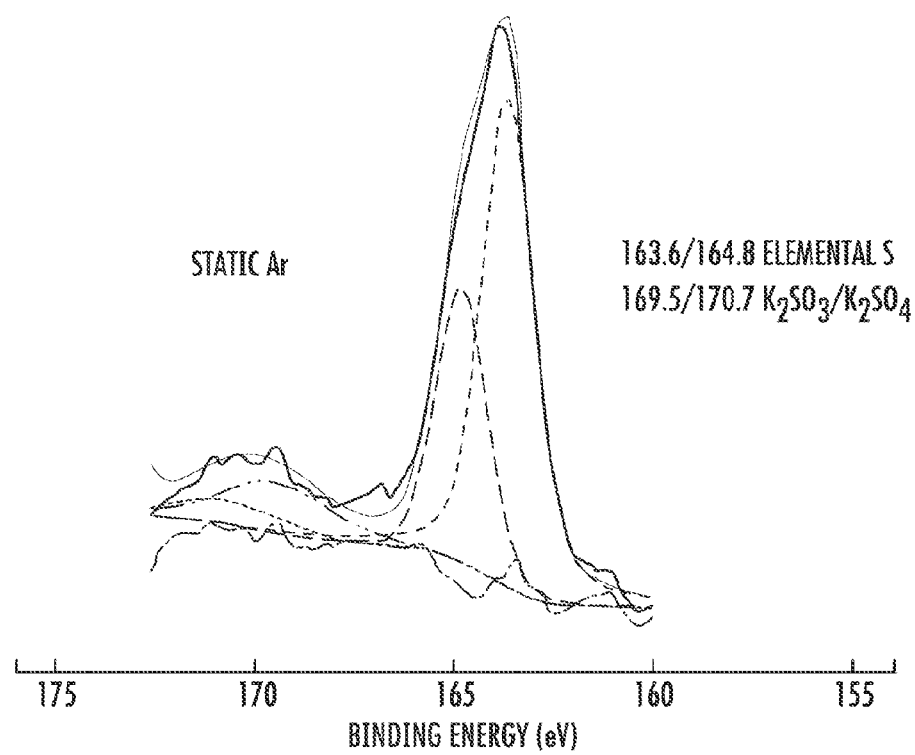

FIGS. 21(a) and (b) depict electrochemical behavior for samples subjected to flowing and static Ar blankets. Specifically, FIG. 21(a) depicts the binding energy for a sample subjected to a flowing Ar blanket, while FIG. 21(b) depicts the binding energy for a sample subjected to static Ar blanket. These results indicate that the elemental sulfur content is greatly increased by the use of a static argon blanket instead of an argon carrier gas flow.

Figure 13:
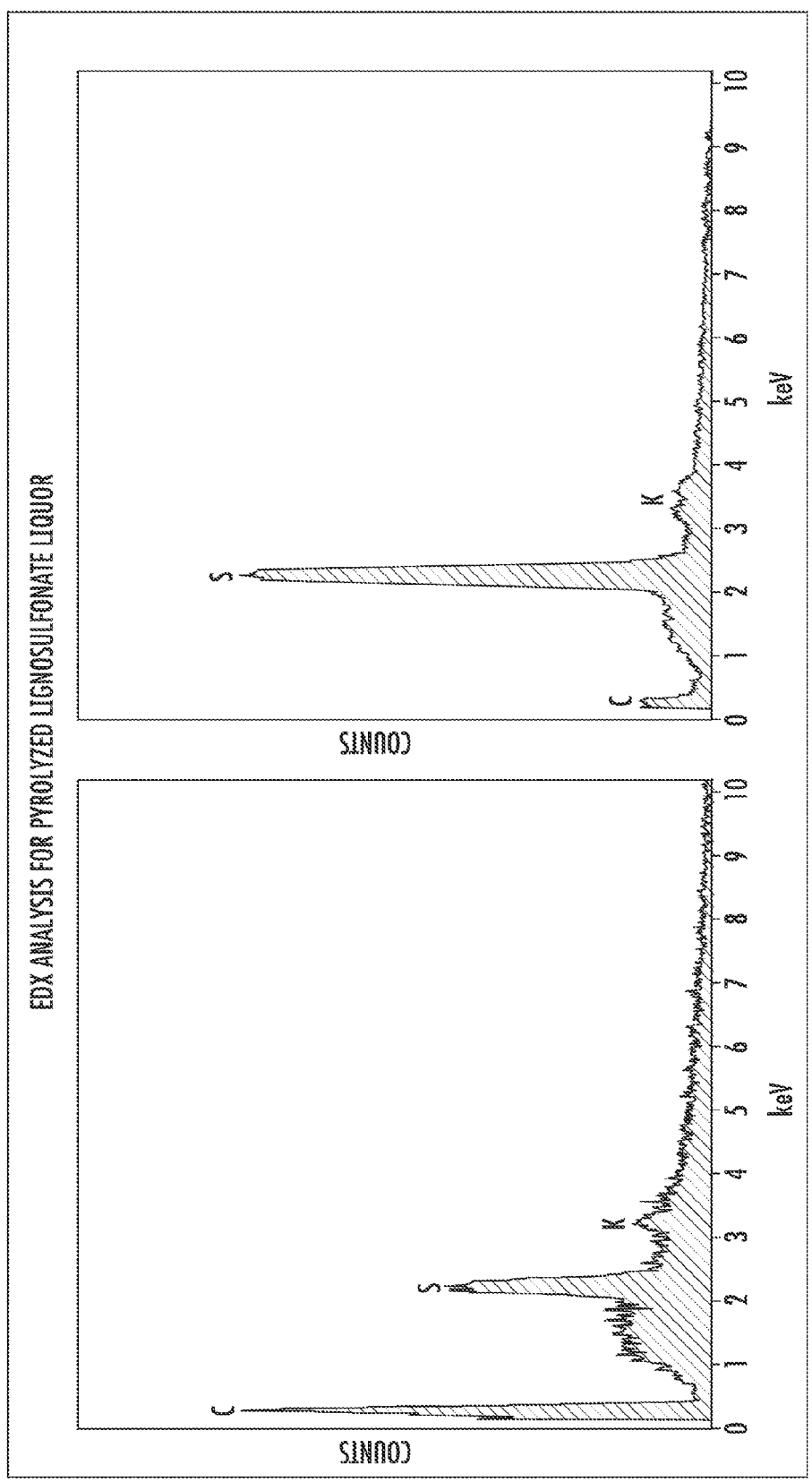
FIG. 13 depicts the results of an EDX analysis for pyrolyzed lignosulfonate liquor.

FIG. 13 depicts the results of an EDX analysis for pyrolyzed lignosulfonate liquor. The plot on the left shows results from EDX spectroscopy performed when the lignosulfonate was in a flowing argon blanket. The plot on the right shows results from EDX spectroscopy performed when the lignosulfonate was in a static argon blanket. The EDX spectroscopy shows the relative intensity of peaks for carbon (C), sulfur (S), and potassium (K). The amount of sulfur in the pyrolyzed material was substantially higher for the static Ar blanket, which allowed the sulfur to stay in the reaction zone, and later be infused at lower temperature (155° C.). All x-axis scales are from 0.0 to 10.2 keV, and the y-axis is shown with arbitrary units.

FIGS. 24(a)-(g) depict the relative sizes of S allotropes (adapted from J. Am. Chem. Soc. 2012, 134, 18510-18513). The size impacts the extent to which the sulfur ($S_4$) infiltrates into the material in the final stage of cooking. Infiltration may not be possible with cyclic $S_8$, as the larger allotropes may not be able to penetrate the small and tortuous pores of the activated carbon matrix formed during pyrolysis.

Figure 29:
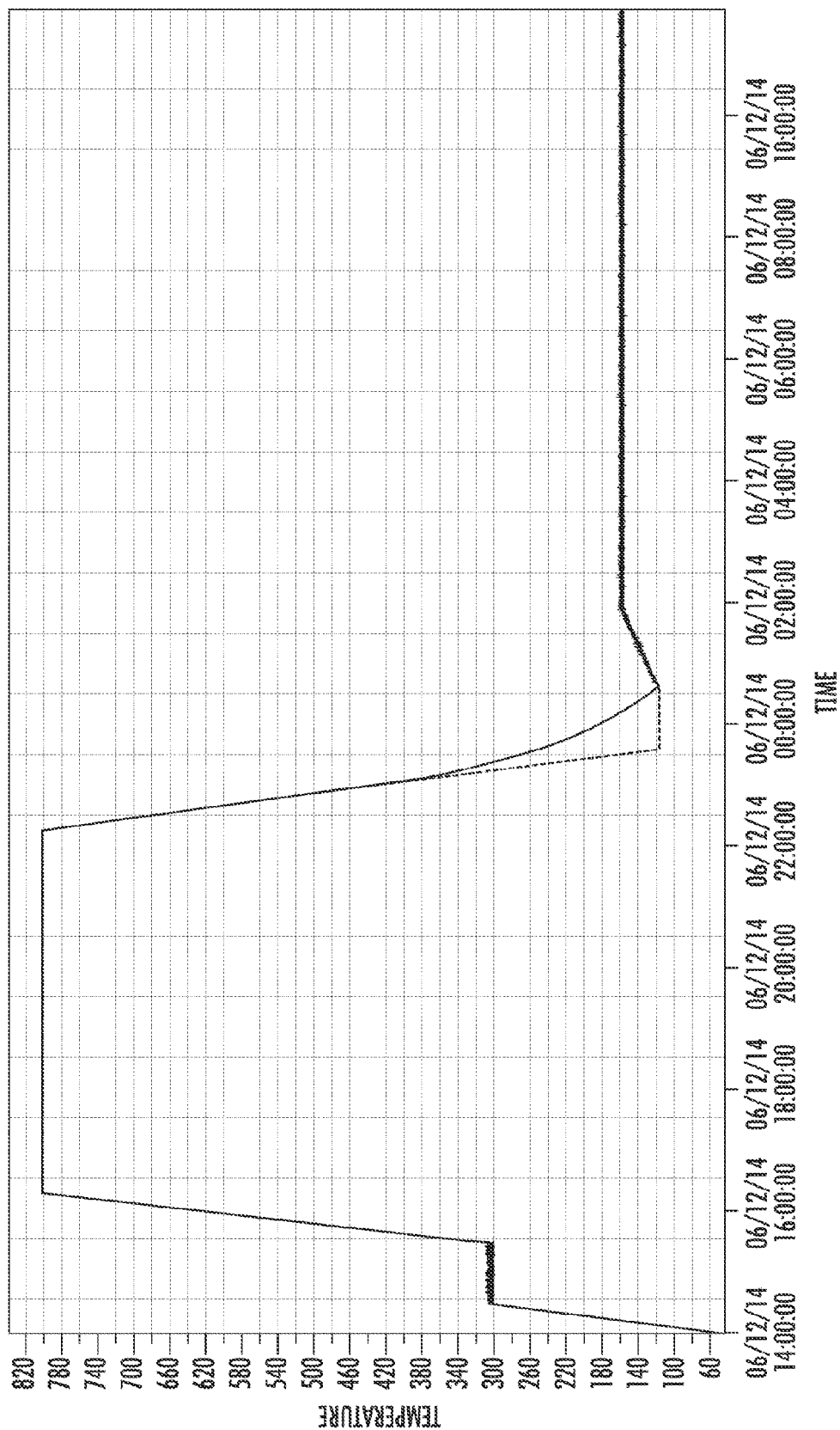
FIG. 29 depicts pyrolysis conditions used to produce high sulfur content material.

FIG. 29 depicts pyrolysis conditions used to produce high sulfur content material. The temperature was ramped to 300° C. and held isothermal for 1 hour, then ramped to 800° C. and held isothermal for 6 hours. Following these processes, the temperature was cooled to 120° C., ramped up to 160° C. and held isothermal for 10 hours. This pyrolysis method resulted in a conductive carbon material having a dense, high surface area with a relatively high sulfur content. The final stage of the pyrolysis allowed for the sulfur that was vaporized in the previous steps to be infiltrated into the carbon material.

The heat treatment process of the brown liquor is critical to the final product and affects not only the quality but also the application of the material in Li—S batteries. The importance of the heat treatment is attributable to several factors and is underscored by various processing considerations. As an example, consider the carbon-sulfur material used in a cathode of a Li—S battery. The carbon-sulfur matrix should provide superior porosity in order to allow the electrolyte to wet the material and thereby assist in the transport of lithium ions and the subsequent reaction with sulfur.

In contrast to the approaches employing PMMA-silica based templates, the synthesis techniques of the embodiments, as reflected in FIGS. 1(a) and 1(b), are less complicated, thereby lowering the overall cost of the materials. Such techniques have the benefit of being more likely to realize a reduced manufacturing cost of $100 per kWh. Further, the pyrolysis techniques ensure that the porosity is inherently incorporated into the material structure, as indicated in FIGS. 1(a) and 1(b). By ramping the temperature to 300° C. and maintaining isothermal for 1 hour, an initially open structure is formed, which is then carbonized at 800° C. to form a denser but still porous material. The sample is then cooled and ramped back to 155° C. to allow for sulfur infiltration. In some embodiments, the aforementioned operations are a "1-pot" synthesis involving several steps.

Such techniques, in turn, lead to a significant reduction in the number of steps and hence, the cost of the material. Accordingly, such techniques represent a significant improvement for preparation of Li—S cathodes.

In commercial Li-ion batteries, 10-20% by weight of an electrode may be activated carbon, in order to improve the conductivity of the electrodes. Similarly, in Li—S batteries, attaining enhanced conductivity within the cathode has previously engendered the use of various synthesis techniques. However, these techniques are often expensive or complicated.

In one such technique, for example, sulfur particles are combined with graphene through a hydrothermal assembly technique. While graphene significantly assists in improving the conductivity of the composite cathode, its use constrains the scalability of the cathode. Scalability is defined here as the mass of the cathode per unit area of the electrode material. The battery industry has set forward a minimum mass loading of 5 $mg/cm^2$ that is to be achieved for commercial feasibility. However, with graphene being the lightest material used, achieving such a mass loading is a considerable challenge. In addition, incorporation of graphene further drives up processing costs, at least because the production of graphene in large quantities and at a commercial scale has not yet been developed, and remains complicated. Unlike such approaches, the synthesis techniques of the embodiments employ annealing to attain enhanced electrical conductivity within the material, thereby eliminating the need for incorporation of additional conductive additive.

The techniques of the embodiments also allow for Li—S battery cathodes to have a substantially homogeneous distribution of sulfur within the carbon matrix. Heterogeneous distributions are associated with several disadvantageous that are avoided by the present embodiments. For example, in heterogeneous distributions, clusters of sulfur that are non-uniformly distributed across the matrix may result in electrode decomposition, loss of sulfur, irreversibility and other undesirable side reactions. Furthermore, one of the significant limitations of poorly-distributed sulfur is that the distribution may result in C—Li interactions being more favored, whereas Li—S reactions are restricted to small regions within the matrix, where an agglomeration of sulfur particles is present.

In other words, materials having heterogeneous distributions would behave as an Li-ion battery as opposed to an ideal Li—S battery, providing energy densities and capacities expected from Li-ion batteries (150 Wh/kg and 300 mAh/g respectively). Thus, such materials would not realize the enhanced densities and capacities associated with Li—S cathodes having more preferable distributions. Moreover, the presence of multiple interactions (Li—C and Li—S) within the same system can critically affect the electrode life, resulting in rapid degradation of the cathode and therefore shortening the life of the battery itself. In addition, varied and multiple electrochemical reactions within the Li—S cathodes would adversely affect the operating voltage, resulting in fluctuations and instabilities that would make them incompatible with the desired end-use applications.

Figure 2A:
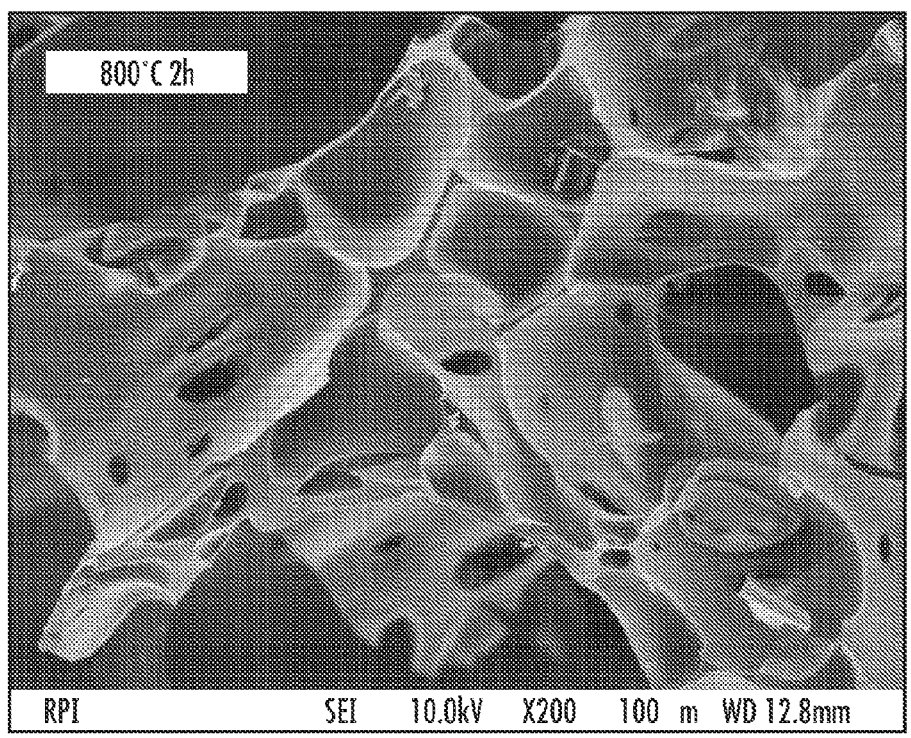
FIG. 2(a) is an SEM image at 200× magnification of a fractured activated carbon sample heated to 800° C. for one hour.
Figure 2B:
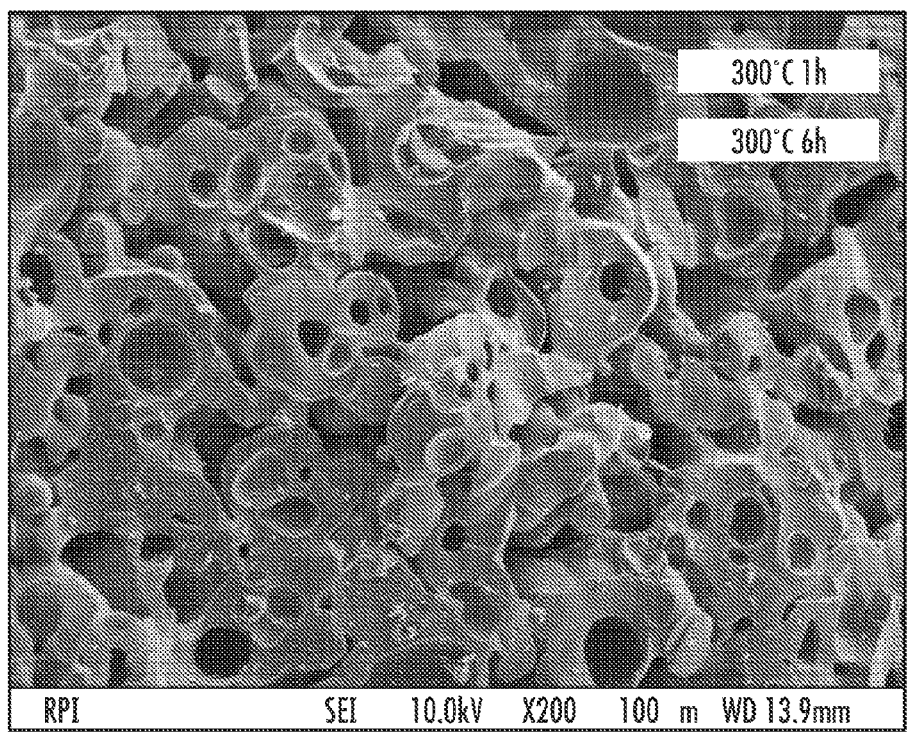
FIG. 2(b) is an SEM image at 200× magnification of a fractured activated carbon sample heated to 300° C. for one hour and then heated to 800° C. for six hours.

The processes of the embodiments ensure that the sulfur is well distributed within the carbon matrix, as indicated by FIGS. 2(a) and 2(b). FIG. 2(a) is a Field Emission Scanning Electron Microscope (FE-SEM) image at 200× magnification of a fractured activated carbon sample heated to 800° C. for one hour and held isothermal for two hours, while FIG. 2(b) is an FE-SEM image at 200× magnification of a fractured activated carbon sample heated to 300° C., held isothermal for one hour, and then heated to 800° C., and held isothermal for six hours. More particularly, FIGS. 2(a)-(b) depict a scanning electron micrograph of pyrolyzed lignosulfonate from Aldrich (benchmark material).

The images in FIGS. 2(a) and (b) were obtained via a JEOL FE-SEM at an accelerating potential of 10 kV. Both of the activated carbon materials shown in FIGS. 2(a) and 2(b) were 27% of their original mass and exhibit highly compacted structures. The similarity in mass loss was observed despite the significant differences in isothermal stage at 800° C., suggesting that the longer time leads to reorganization of the carbon bonding, and not to further mass loss.

Figure 3:
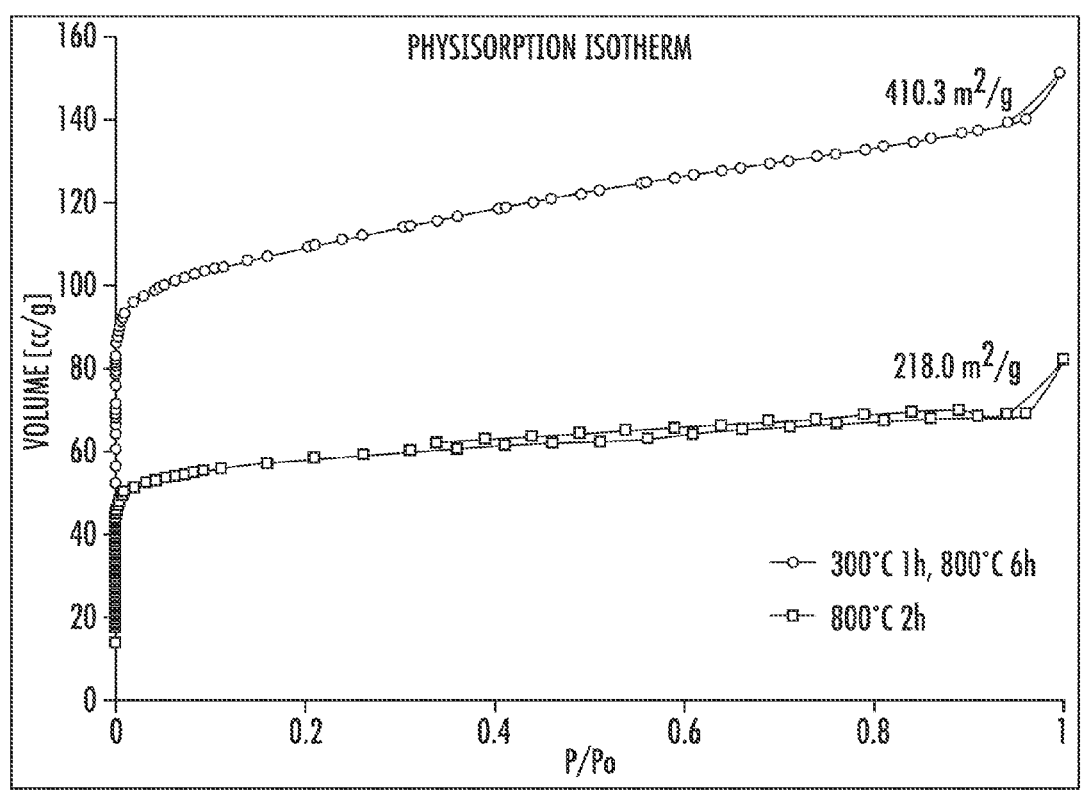
FIG. 3 depicts physisorption isotherms corresponding to the processes shown in FIGS. 1(a) and 1(b).

While the FE-SEM images shown in FIGS. 2(a) and 2(b) clearly show the micron-scale porosity, further understanding of the mesopore and micropore structures of the materials was attained via physisorption experiments conducted with a Quantachrome AS-1. FIG. 3 depicts physisorption isotherms for carbonization corresponding to the processes shown in FIGS. 1(a) and 1(b). More particularly, FIG. 3 depicts physisorption isotherms of nitrogen onto pyrolyzed lignosulfonate (Aldrich benchmark precursor) at 77 K. The surface area for each sample as determined by BET theory is shown above each plot. Substantially higher surface area, indicative of improved battery performance, was observed for the two step pyrolysis.

To produce the isotherms of FIG. 3, a small sample (approximately 30 mg in mass) of the material was removed. Ultra-high purity nitrogen was used to refill the gap caused by the evaluation of the sample. The Brunauer-Emmett-Teller (BET) surface area was calculated, as was the density functional theory (DFT) pore size distribution. The physisorption isotherms are shown in FIG. 3 along with the calculated BET surface area. The longer time at 800° C. correlated to a clear increase in the surface area of the carbon material. The DFT pore size distribution calculations indicate that the majority of the pores are sub-nanometer in scale. The longer treatment time at 800° C. is shown to nearly double the surface area and is reflected by the significant increase in micropores in the DFT pore size distribution shown in FIG. 4 and discussed below.

Figure 4:
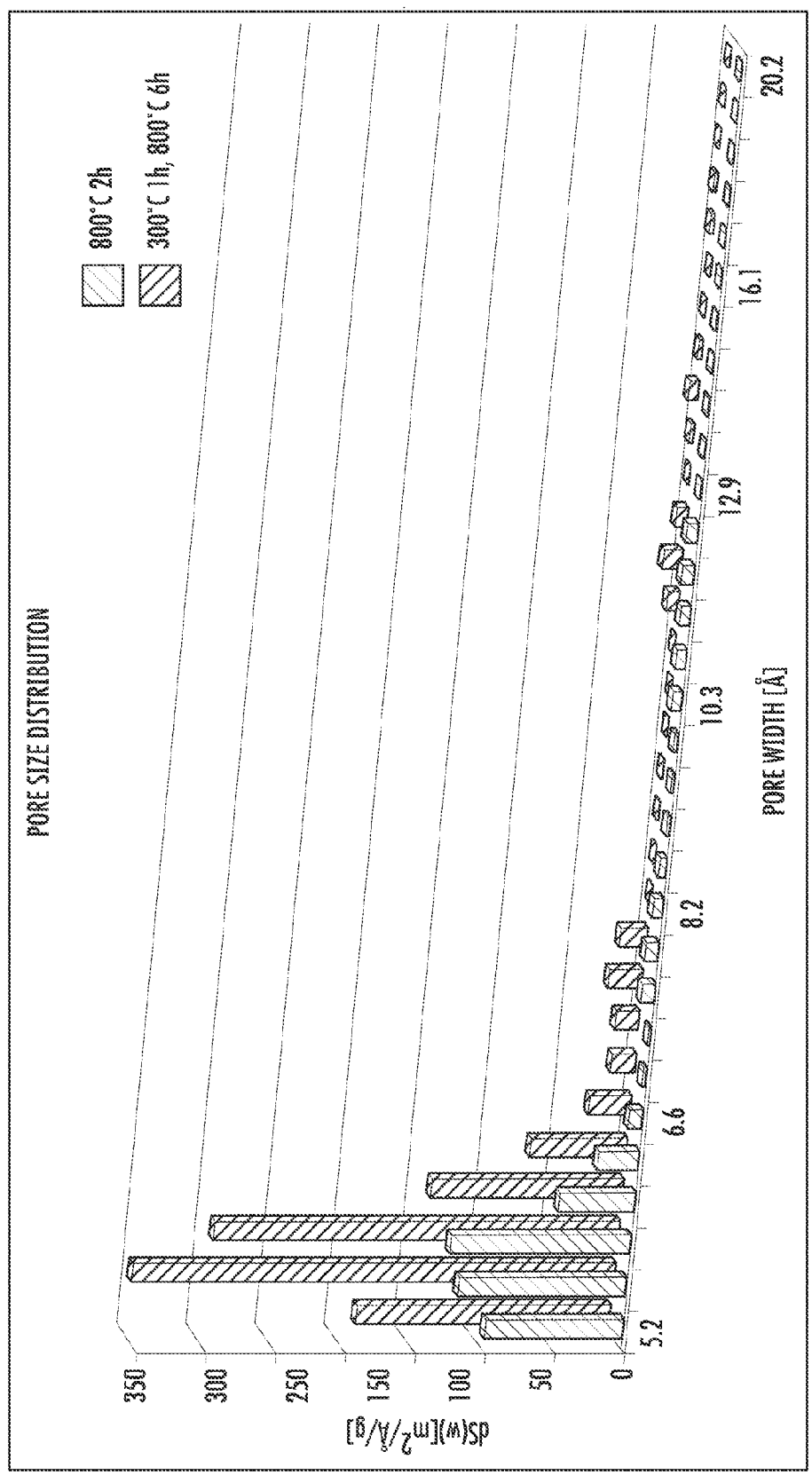
FIG. 4 depicts density functional theory (DFT) pore size distribution calculated values for the processes shown in FIGS. 1(a) and 1(b).

FIG. 4 depicts DFT pore size distribution calculated values for samples processed according to FIGS. 1(a) and 1(b), respectively. DFT pore size distribution values were calculated for the respective synthesis techniques. The majority of the micropores were revealed to be less than 1 nm. The BET surface areas for the short activation and long activation samples were 218.0 $m^2/g$ and 410.3 $m^2/g$, respectively, with a correlation coefficient of 0.99998 for both cases. The total pore volume for these materials was 0.115 cc/g and 0.210 cc/g, with a fitting error of 0.74% and 0.79% respectively. Similar distributions of pore sizes are seen (shown in pore width in angstroms), indicating that the materials are structurally similar, but that the two step pyrolysis material is denser and has a greater number of pores.

Figure 5A:
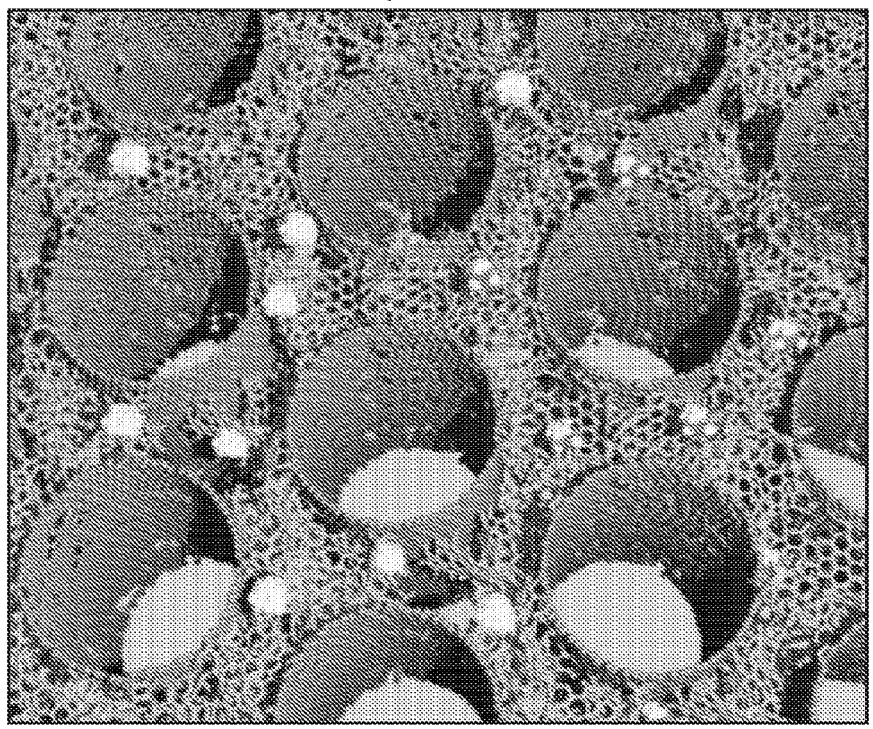
FIG. 5(a) depicts hierarchical nanostructured porous carbon-sulfur cathodes with 2D hexagonal packing of mesopores.
Figure 5B:
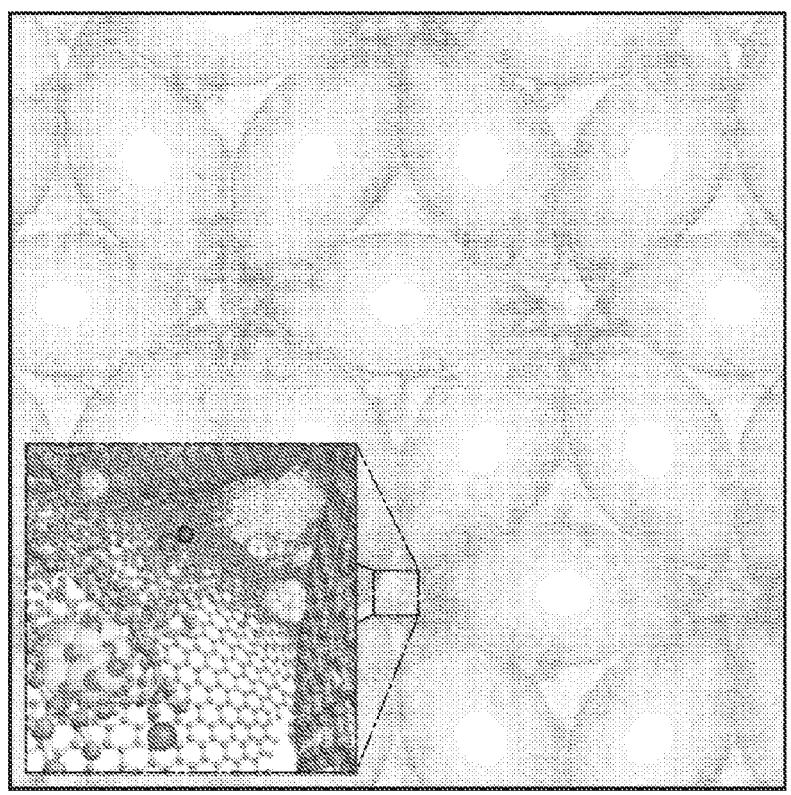
FIG. 5(b) depicts hierarchical nanostructured porous carbon-sulfur cathodes with 3D close packing of mesopores.

FIG. 5(a) depicts a hierarchical nanostructured porous carbon-sulfur (HNPC—S) cathode with 2D hexagonal packing of mesopores. The yellowish white atoms are S clusters, while red atoms are Li ions. FIG. 5(b) depicts a hierarchical nanostructured porous carbon-sulfur (HNPC—S) cathode with 3D close packing of mesopores, where yellowish white atoms are sulfur clusters, red atoms are Li ions, and white areas are the channels between mesopores.

Returning to the subject of sulfur distribution, by ensuring that the sulfur is well distributed within the carbon matrix, a high accessibility of sulfur atoms for Li—S reactions throughout the bulk of the electrode may be obtained. The resulting high accessibility of sulfur atoms avoids localized C—Li interactions, which would otherwise be detrimental to the battery cycle life. The predominance of Li—S interactions is reflected in the plots shown in FIGS. 6, 9 and 10. The electrochemical aspects of the Li—S interactions are manifested in phenomena including galvanostatic charging and discharging, voltage profiles, storage capacity, and energy density.

Figure 7:
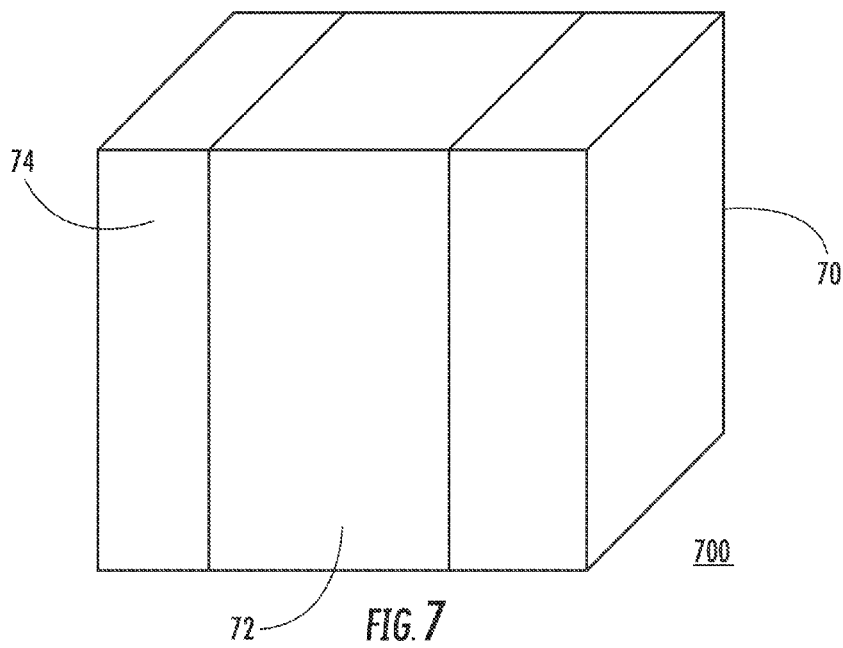
FIG. 7 depicts a Li—S battery with a cathode containing sulfur.

In at least one embodiment, the carbon-sulfur material is combined with an electrode binder and added to a standard electrolyte used in Li—S batteries. FIG. 7 depicts a Li—S battery 700 with a cathode 70 containing the carbon-sulfur material, and an electrolyte 72 separating the cathode 70 from lithium 74. In some embodiments, the carbon-sulfur material is assembled into 2032 coin cells to assess its performance characteristics as a potential cathode material for Li—S batteries.

Figure 25:
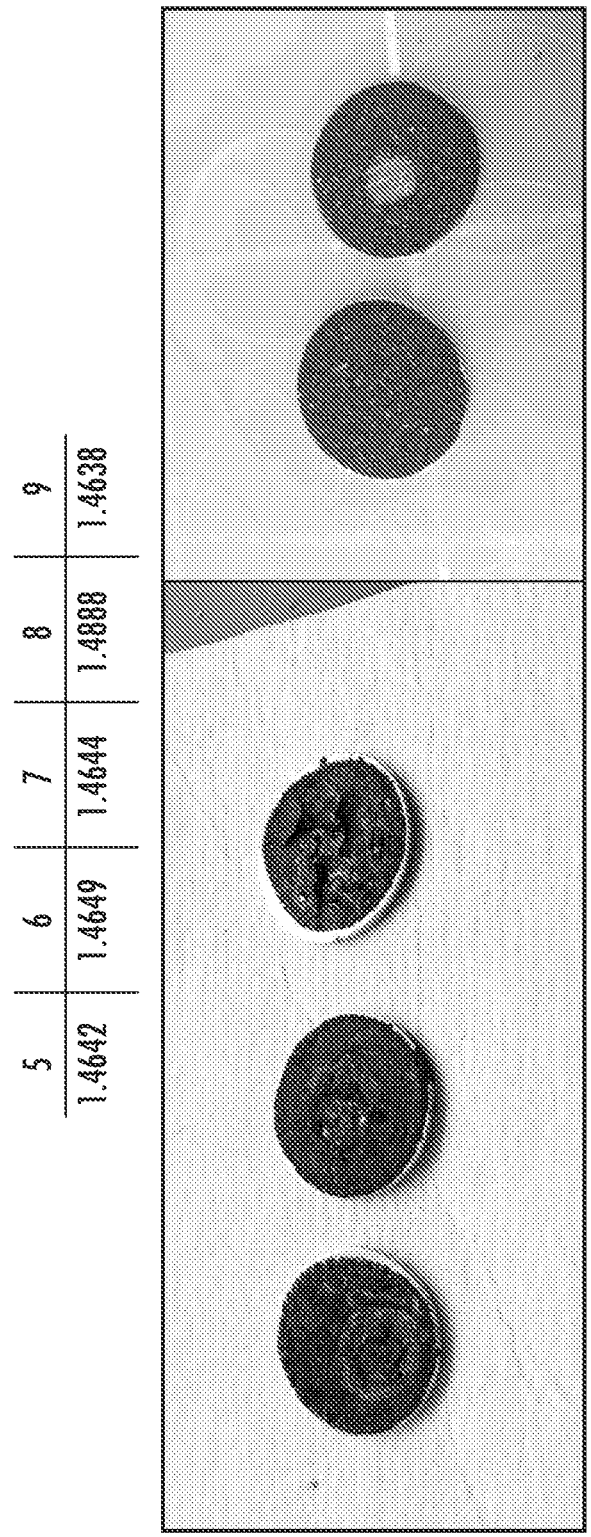
FIG. 25 depicts cathodes prepared for experimentation.
Figure 26A:
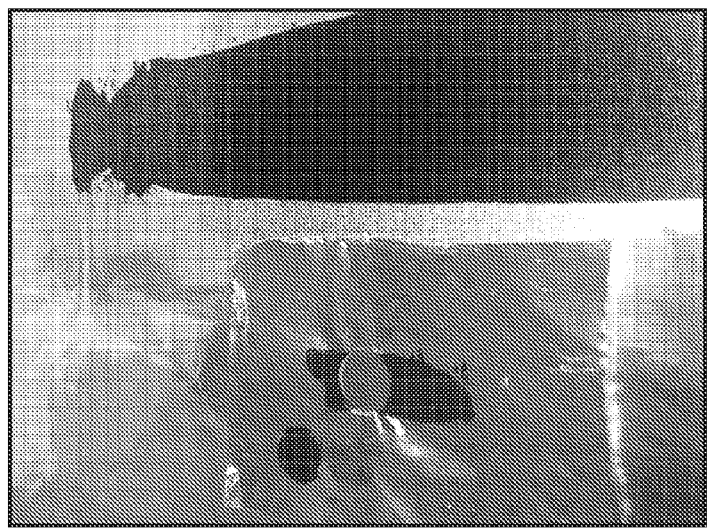
FIGS. 26(a)-(c) depict cathode materials prepared for experimentation.
Figure 26B:
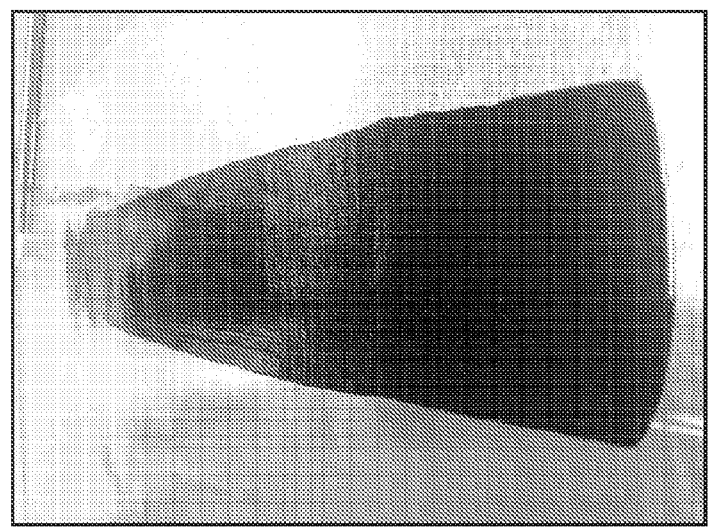
Figure 26C:
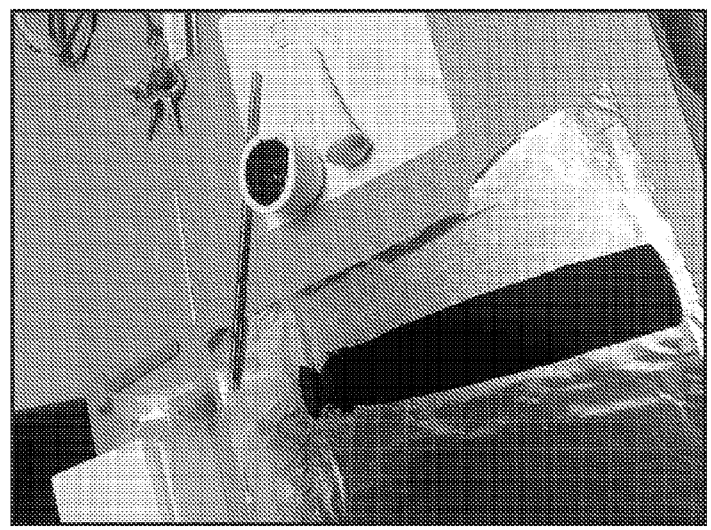
Figure 27:
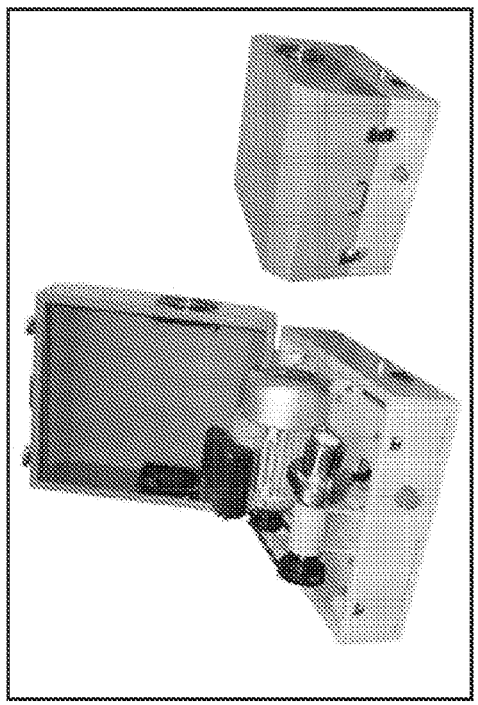
FIG. 27 depicts equipment used to produce cathode material.
Figure 27:
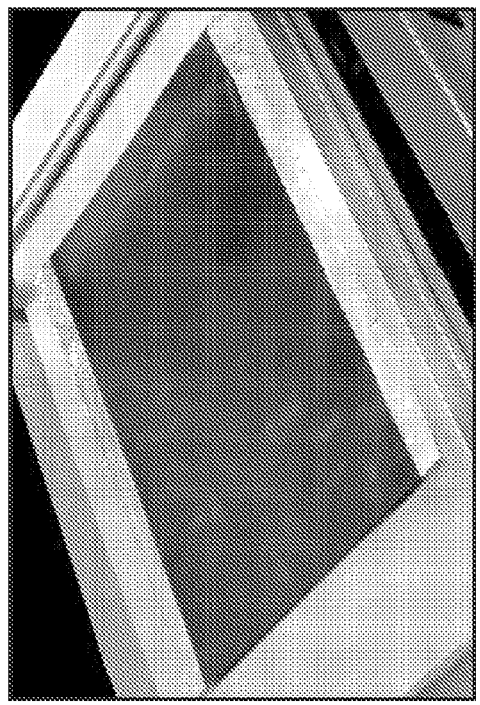
Figure 27:
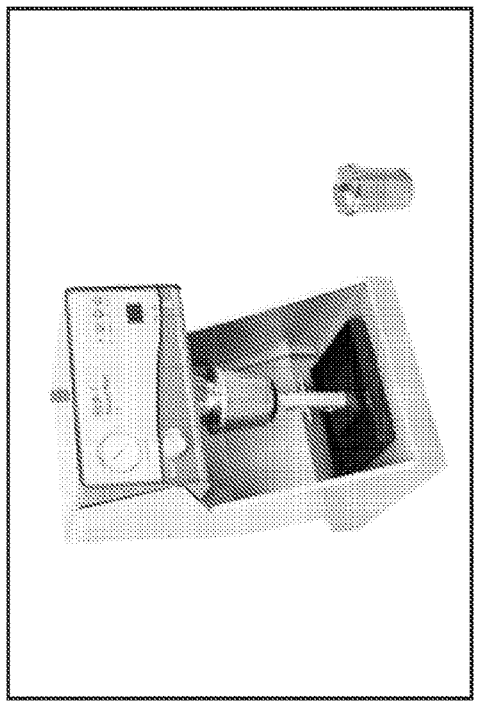
Figure 27:
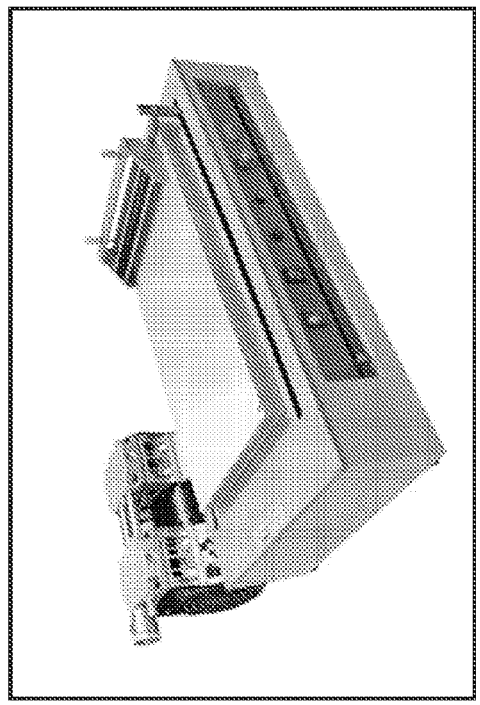

FIG. 25 depicts cathode cells prepared for experimentation. FIGS. 26(a)-(c) depict cathode materials prepared during experimentation. FIG. 26(a) shows cathode material ground with a mortar and pestle, FIG. 26(b) shows cathode material prepared via Meyer rod coating, and FIG. 26(c) depicts a cathode that was punched out of foil shown in FIG. 26(b) and which is ready for the coin cell assembly. The cathode materials of FIGS. 26(a)-(c) were produced by mixing 80 wt % pyrolyzed lignosulfonate, 10 wt % sodium alginate, and 10% conductive carbon black additive in water to form an "ink" paste. This was then ground into a uniform "ink" that was then coated on battery grade foil with a Meyer rod, and then dried in an oven at 120° C. FIG. 27 depicts equipment used to produce cathode material.

Figure 28:
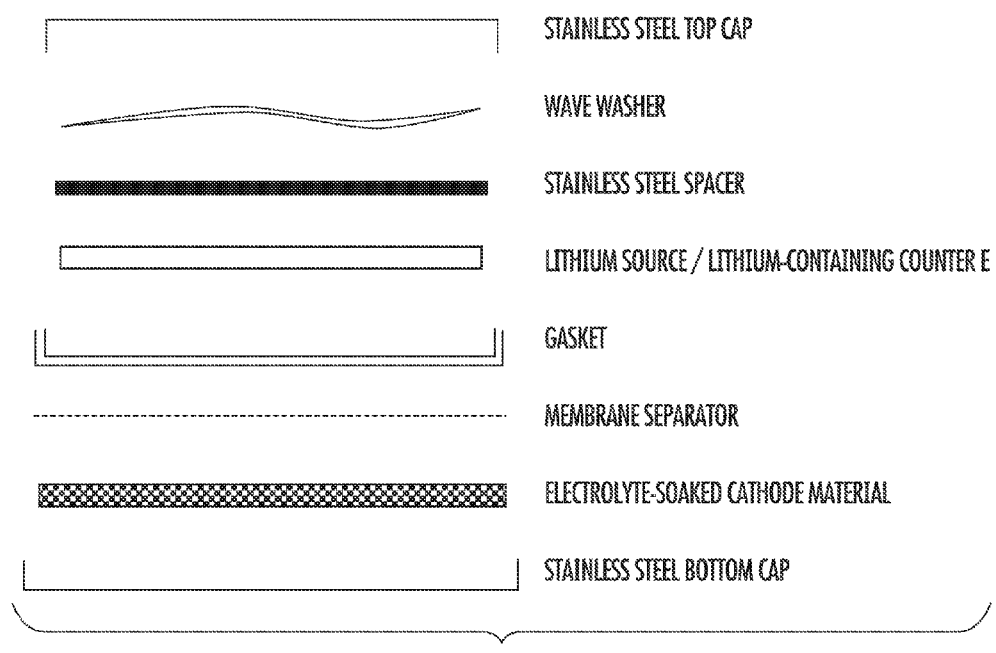
FIG. 28 depicts a battery including a counter electrode comprising lithium.

FIG. 28 depicts a battery comprising a stainless steel top cap and a stainless steel bottom cap at its top and bottom ends. Sandwiched between the top and bottom caps, in descending order from the top end to the bottom end, are several components. These components may include, but are not limited to, a wave washer, a stainless steel washer, a lithium source or a counter electrode comprising lithium, a gasket, a membrane separator, and a cathode material with an electrolyte coating. The metallic material is not limited to stainless steel and may be replaced with alternatives having appropriate electromechanical properties.

Figure 14:
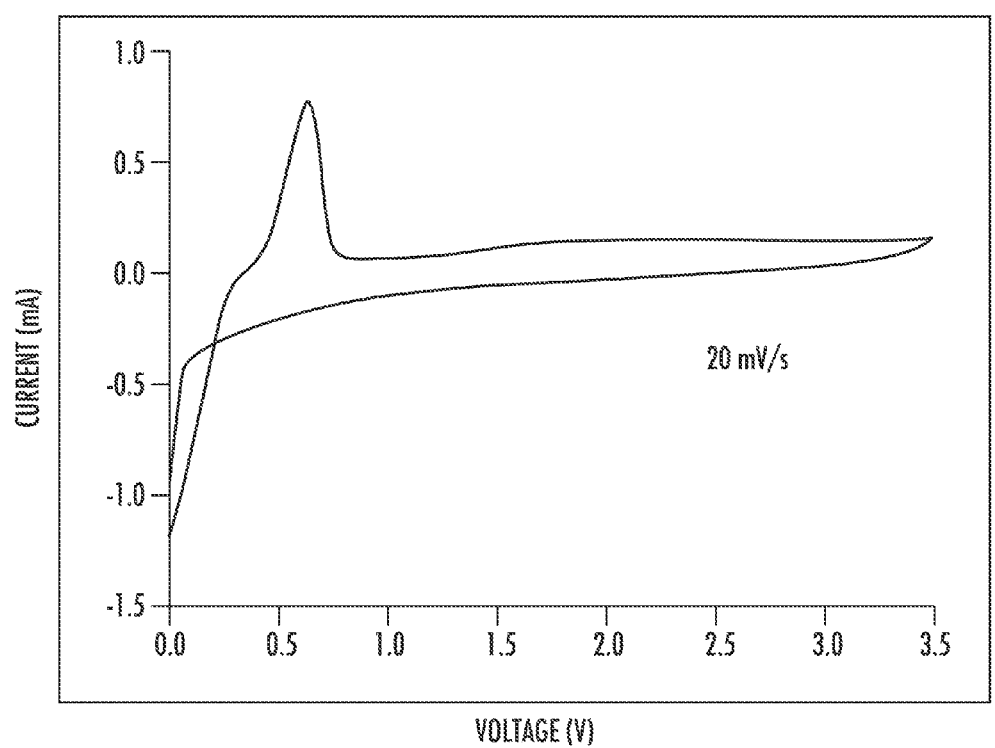
FIG. 14 is a plot of voltage versus current for 0.5M lithium bis(trifluoromethane)sulfonimide in tetraethylene glycol dimethyl ether.

In at least one embodiment, the counter electrode may be a lithium foil, and the separator may be a standard Celgard 2340 polypropylene membrane, by way of illustration. The electrolyte may be 0.5M lithium bis(trifluoromethane)sulfonimide in tetraethylene glycol dimethyl ether, for example. By way of illustrative example, FIG. 14 is a plot of voltage versus current for 0.5M lithium bis(trifluoromethane)sulfonimide in tetraethylene glycol dimethyl ether.

Figure 6:
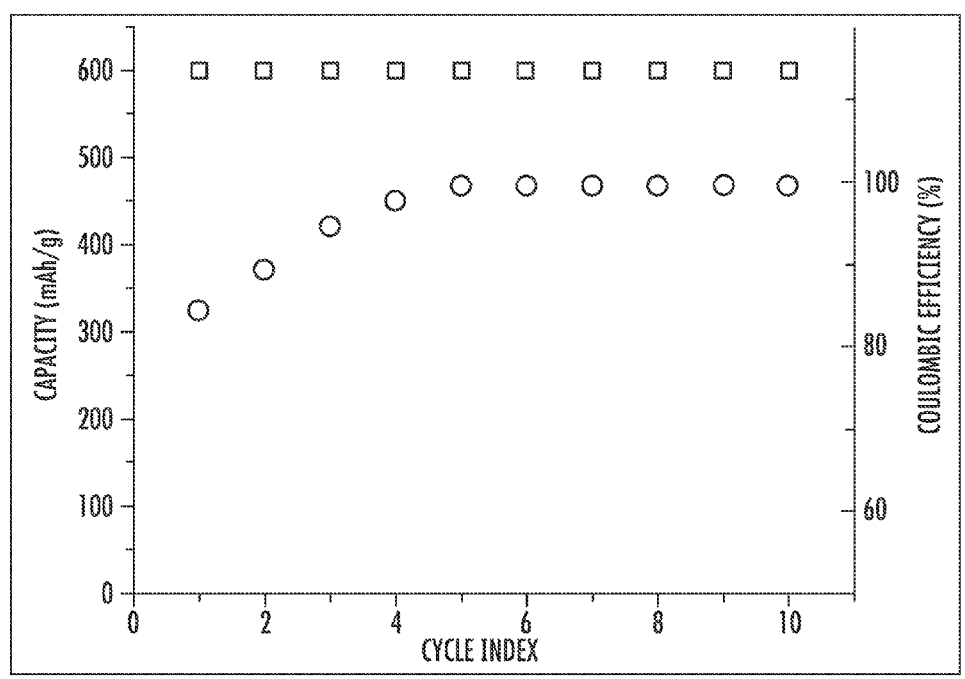
FIG. 6 is a plot of capacity and Coulombic efficiency as a function of cycle index for C—S cathodes in a Li—S battery.

The cathodes of such embodiments exhibit excellent reversible capacities of up to 600 mAh/g, as shown in FIG. 6, which plots capacity and Coulombic efficiency as a function of cycle index for C—S cathodes in a Li—S battery. In particular, FIG. 6 plots these parameters for a ithium sulfur battery half cell composed of a lithium foil vs. lignosulfonate cathode (lignosulfonate 80 wt %, PVDF 10 wt %, carbon black 10 wt %) showing consistent capacity over 10 cycles. The Coulombic (or roundtrip) efficiency is nearly 100%, indicating stable and repeatable electrochemistry. The reversible capacity of up to 600 mAh/g corresponds to an energy density in excess of approximately 400 Wh/kg. This energy density is roughly a two-fold increase over commercial Li-ion batteries. Given that the theoretical capacity for Li—S batteries is as high as approximately 3400 mAh/g, the employment of suitable electrolytes and further refinement of the synthesis process represent an opportunity for continued improvement of the cathode performance characteristics. Such improvements are likely necessary to realize the Department of Energy's goals for rechargeable batteries. It is to be noted here that all performance metrics have been normalized with respect to the mass of the electrode.

FIGS. 15(a)-(e) and 30(a)-30(e) depict results from x-ray photoelectron spectroscopy (XPS) analysis, a surface-sensitive quantitative spectroscopic approach that measures the elemental composition (in sensitivity of parts per thousand) and takes into account the empirical formulae for elements in a material and the electrochemical states of those elements. XPS spectra are obtained by irradiating a material with a beam of X-rays while measuring the kinetic energy and number of electrons that escape from the top 0-10 nm of the material being analyzed. XPS thus permits the surface chemistry of a material to be analyzed.

The number of peaks produced by a single element may vary from 1 to more than 20. Experimentally determined BEs are characteristic of specific elements and may be directly used to identify experimentally measured peaks of a material with unknown elemental composition. Before initiating the process of peak identification, it is determined whether BEs of an unprocessed survey spectrum (0-1400 eV) have or have not been shifted due to a positive or negative surface charge. Typically, this determination entails identifying two peaks attributed to the presence of carbon and oxygen. The process of peak-fitting high energy resolution XPS spectra is affected by instrument design, instrument components, experimental settings (e.g., analysis conditions) and sample variables. Some instrument parameters may be constant, while others may vary depending on the choice of experimental settings.

FIGS. 15(a)-(e) and 30(a)-30(e) depict experimental data (the thinnest line in these plots) which contain several peaks within them. MultiPak software from Physical Electronics, Inc. was used to fit the peaks. Individual peaks (shown in dashed lines in the plots) were fit to known energies, and those peak energies are expressed in eV on the graphs. These individual peaks are assigned to a specific chemical bonding which is noted next to the binding energy. The individual peaks were then combined into a multiplet peak (the thickest line shown in the plots) that closely approximates the experimental data.

The XPS analyses of FIGS. 15(a)-(e) and 30(a)-30(e) are results for pyrolyzed lignosulfonate liquors obtained according to two pyrolysis methods. In the first pyrolysis method, an argon carrier gas flow is maintained, the temperature is ramped up to 300° C. and held for one hour, and then ramped up to 800° C. and held for six hours. In the second pyrolysis method, a static argon atmosphere is maintained, the temperature is ramped up to 300° C. and held for one hour, then ramped up to 800° C. and held for six hours before cooling to 120° C. and slowly ramping the temperature up to 160° C. and holding for ten hours. FIGS. 15(a)-(e) and 30(a)-30(e) depict intensity level (plotted with arbitrary scales) versus binding energy.

Figure 15A:
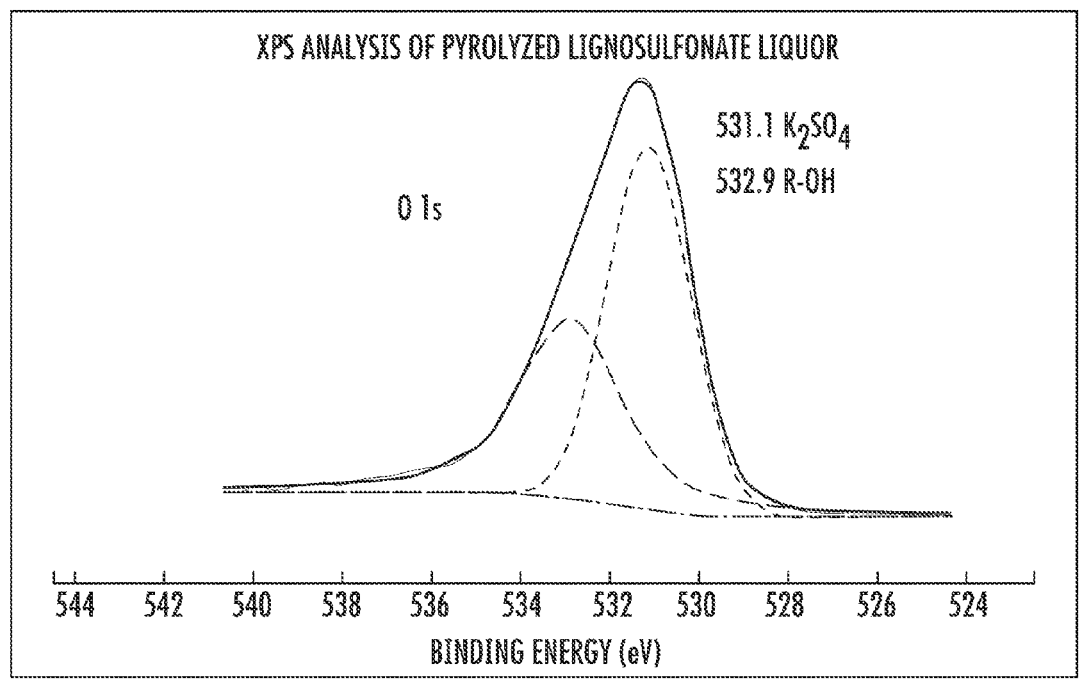
FIGS. 15(a)-(e) depict the results of XPS analyses of pyrolyzed lignosulfonate liquors.
Figure 15B:
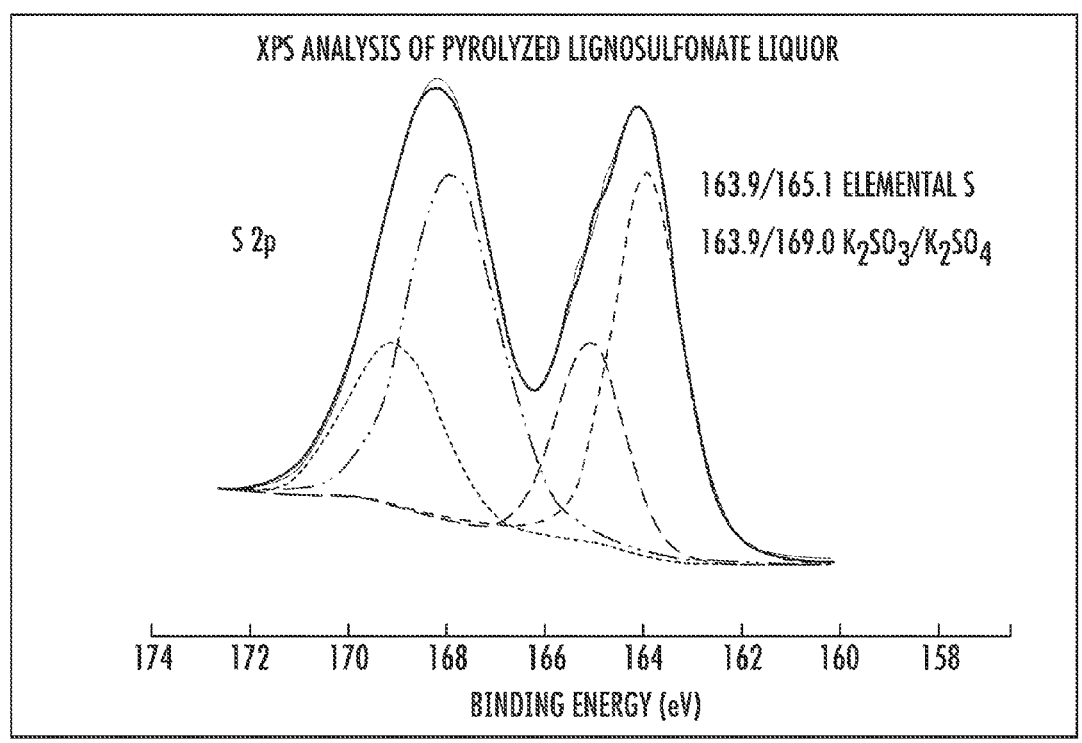
Figure 15C:
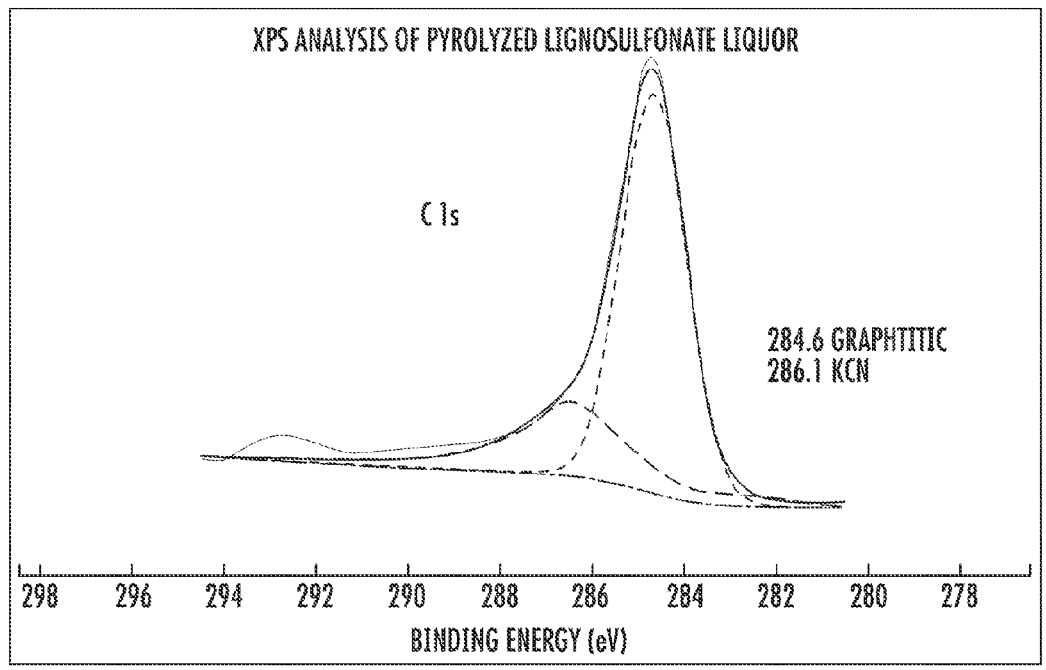
Figure 15D:
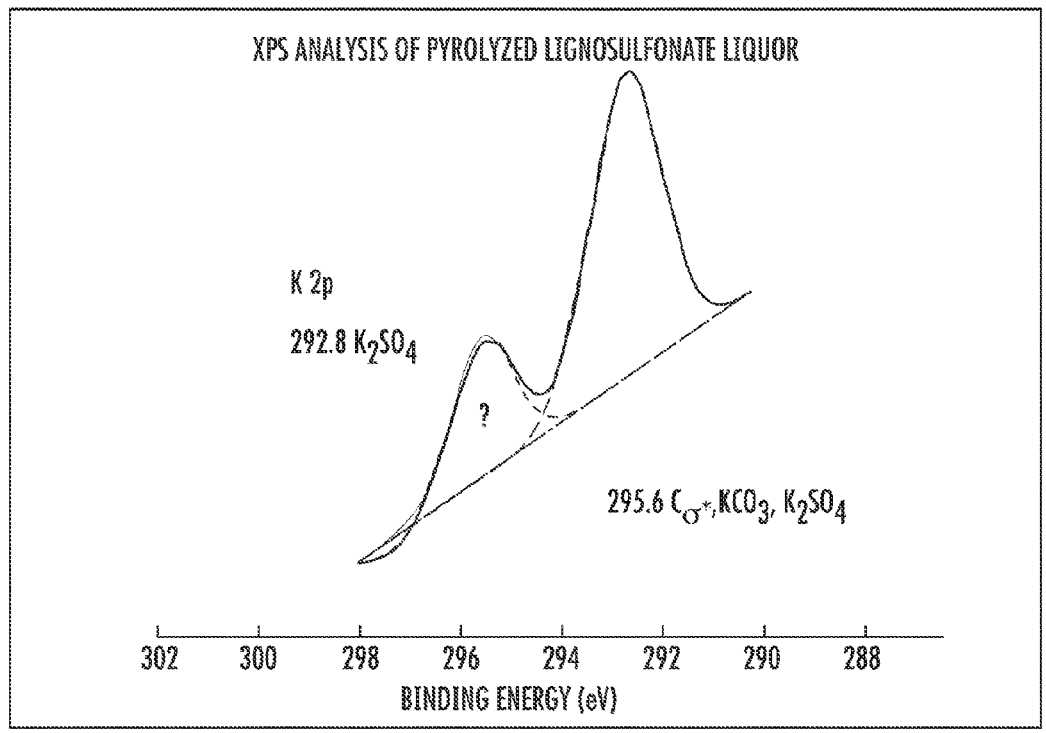
Figure 15E:
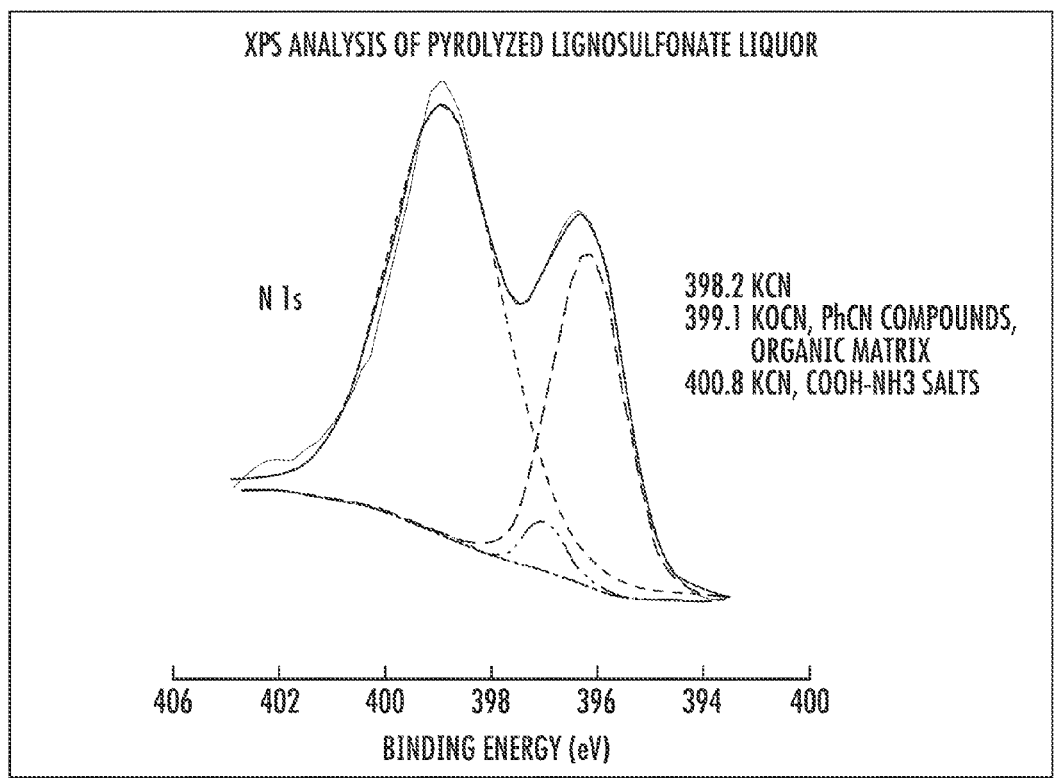

FIG. 15(a)-(e) are plots for electron energy levels of 1s, s2p, c1s, k2p, and n1s, respectively. FIG. 15(a) is a plot depicting results obtained via the first method for oxygen, with peak fitting of 531.1 eV for $K_2SO_4$ oxygen, and 532.9 eV for alcohol oxygen. FIG. 15(b) is a plot depicting results obtained via the first method, with peak fitting of 163.9/165.1 eV for elemental sulfur and 167.9/169.0 eV for $K_2SO_3/K_2SO_4$ carbon. FIG. 15(c) is a plot depicting results obtained via the first method for carbon, with peak fitting of 284.6 eV for graphitic carbon and 286.1 eV for KCN carbon. FIG. 15(d) is a plot depicting results obtained via the first method for potassium, with peak fitting of 292.8 eV for $K_2SO_4$ potassium, and 295.6 eV for what may be $K_2SO_3$ or $K_2SO_4$. FIG. 15(e) is a plot depicting results obtained via the first method for nitrogen, with peak fitting of 398.2 eV for KCN nitrogen, 399.1 eV for phenylcyano nitrogen or organic matrix nitrogen, and 400.8 eV for KCN nitrogen.

Figure 30A:
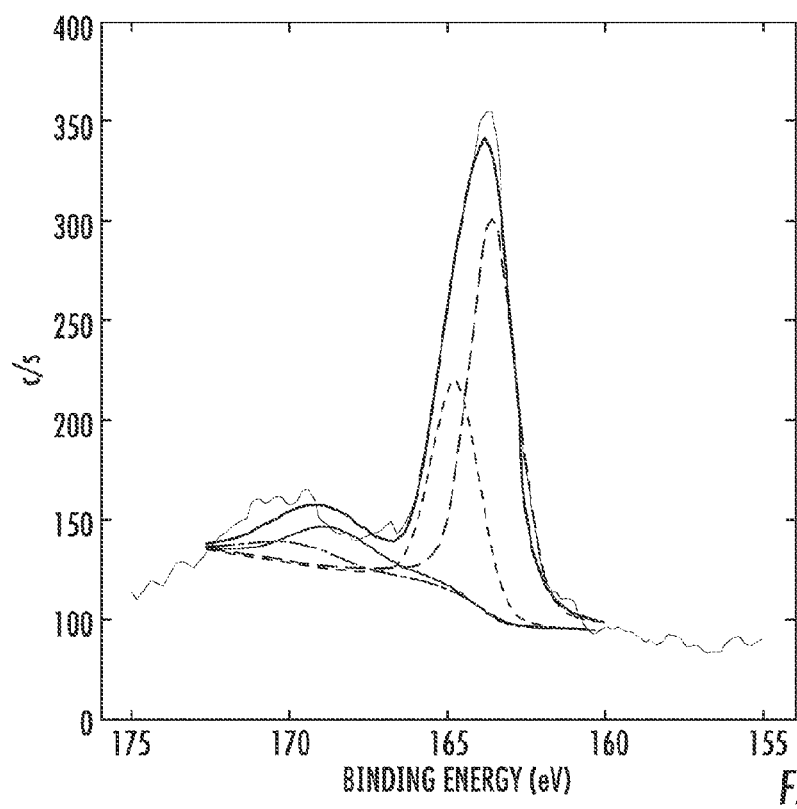
FIGS. 30(a)-30(e) depict the results of XPS analyses of pyrolyzed lignosulfonate liquors.
Figure 30B:
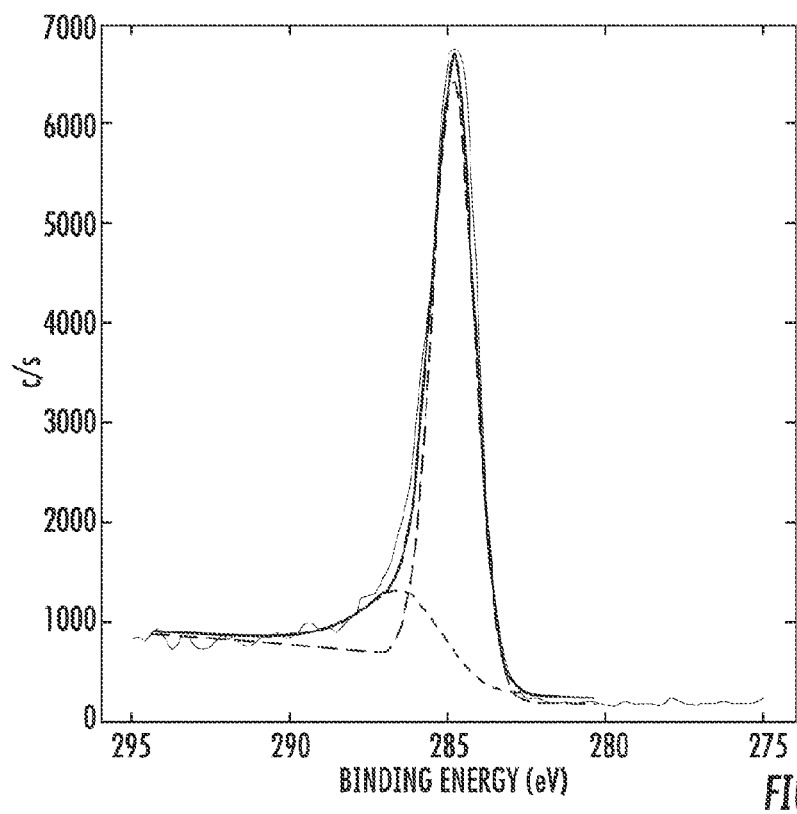
Figure 30C:
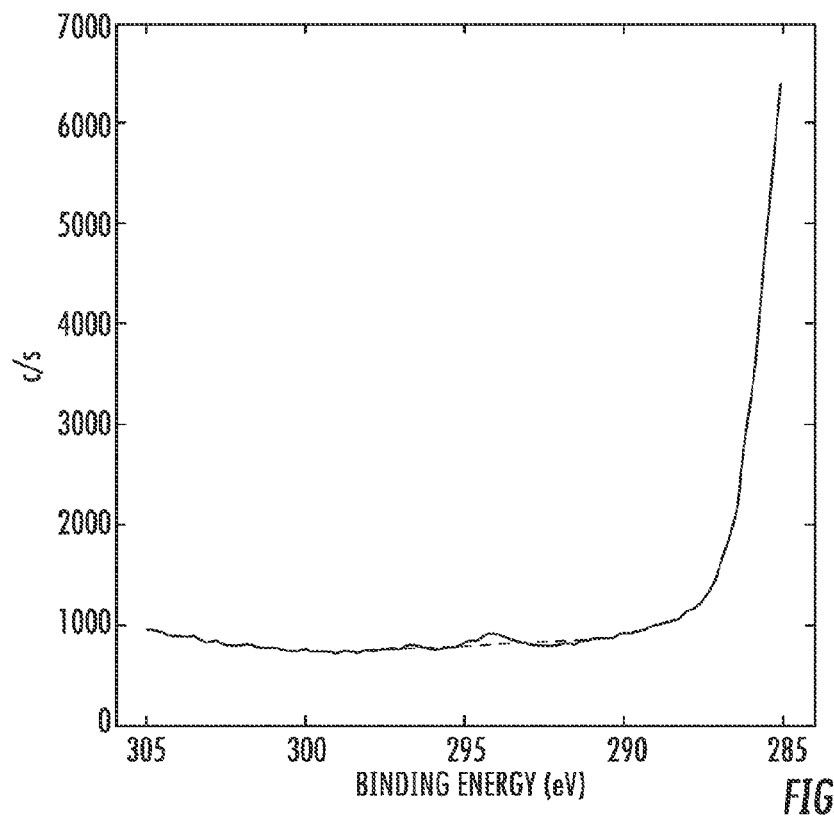
Figure 30D:
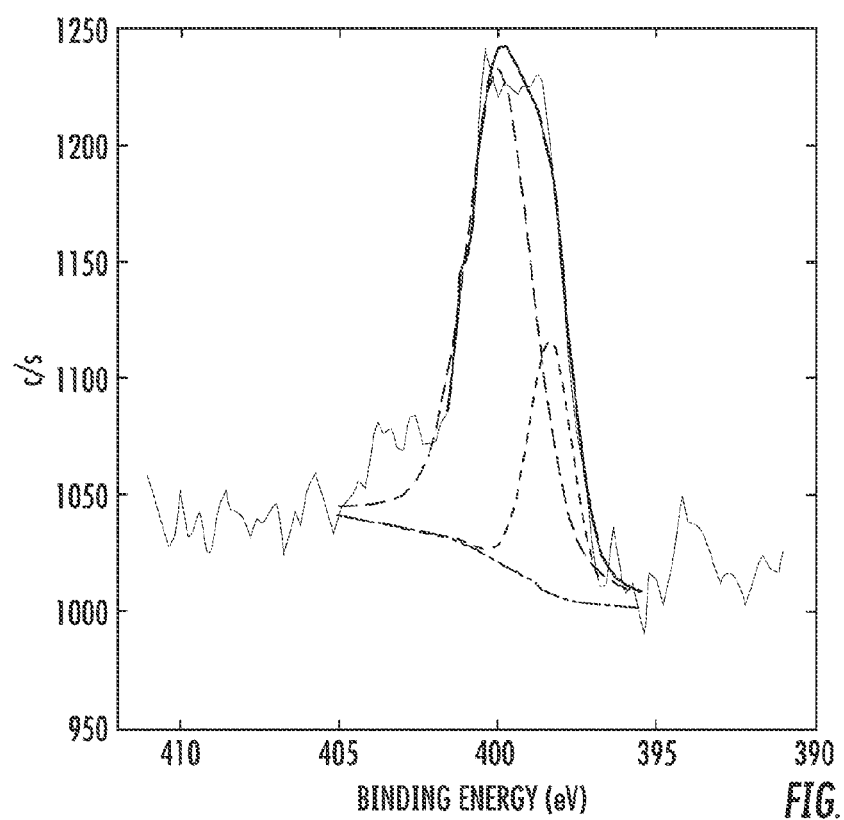
Figure 30E:
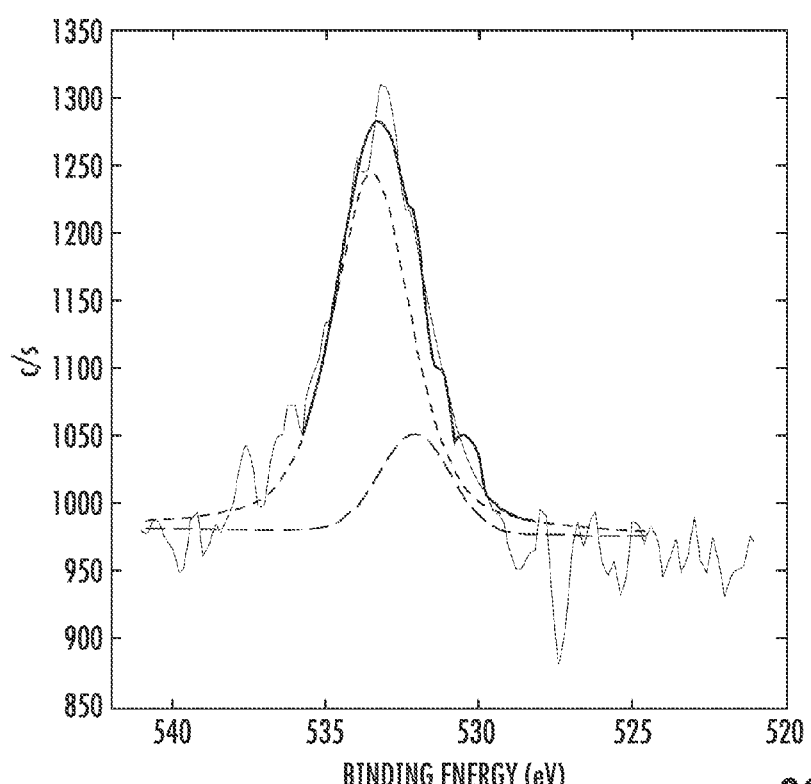

FIGS. 30(a)-(e) depict XPS analyses of data from experimental pyrolysis according to both methods. FIG. 30(a) is a plot depicting results obtained the second method for sulfur, with peak fitting of 163.6/164.8 eV for elemental sulfur and much smaller peaks at 168.7/169.9 eV for what may be $K_2SO_3$ or $K_2SO_4$ carbon. FIG. 30(b) is a plot with results obtained via the second method for carbon, with peak fitting of 284.9 eV for graphitic carbon and 286.5 eV for KCN carbon. FIG. 30(c) depicts results obtained via the second method, in which potassium peaks were too low for fitting. FIG. 30(d) is a plot depicting results obtained via the first method for nitrogen, with peak fitting of 398.4 eV for KCN, 399.0 eV for phenylcyano nitrogen or organic matrix nitrogen, and 400.0 eV for KCN nitrogen. FIG. 30(e) is a plot depicting results obtained via the first method for oxygen, with peak fitting of 532.1 eV for hydroxyl oxygen, 533.5 eV for surface adatom oxygen or for ester oxygen.

The experimental data for the first pyrolysis method revealed that the sulfur present in the material comprised approximately equal parts of sulfate salts and elemental sulfur. The data for the second pyrolysis method indicated that the vast majority of the sulfur was elemental sulfur, which is highly desirable for a Li—S cathode material for the reasons described above. The data for the second pyrolysis also revealed a negligible potassium peak, indicating that the presence of $K_2SO_3$ and $K_2SO_4$ has been reduced to a trace, which is also desirable for an Li—S cathode material. The presence of the nitrophenyl and alkylcyano groups in the nitrogen region for results obtained by the first pyrolysis method indicates that the observed electrochemistry may be partially due to these groups. Reference material indicates that this electrochemical behavior (with a charging plateau around 0.5-0.7 V) may be attributable to these groups. These results were not observed in the XPS analyses for the second pyrolysis methods, which had substantially more elemental sulfur so as to ultimately result in batteries with a charging plateau around 2.8 V.

The synthesis techniques of the embodiments impact the adaption of the resulting C—S material to Li—S batteries. More specifically, these techniques are conducive to achieving a material structure that facilitates, among other things, desirable electron transfer kinetics. In particular, the cathode materials made by such techniques have carbon networks with improved transfer kinetics, as will be described below.

In some embodiments, batteries exhibited an initial Coulombic efficiency of approximately 84%, which may be attributable to the formation of a solid electrolyte interphase.

The Coulombic efficiency, discussed again below, is the ratio of charge to discharge capacity. The initial Coulombic efficiency may be partially due to the formation of insoluble sulfides that result in the formation of irreversible precipitates. Once the irreversible precipitates are formed, the cathode delivers a steady capacity with nearly 100% Coulombic efficiency. A Coulombic efficiency of 100% indicates excellent electrochemical kinetics.

In general, Coulombic efficiency of the first cycle in commercial Li-ion batteries is much lower, generally between 30-50%. In such batteries, in order to stabilize the electrode (primarily through the formation of the solid electrolyte interphase), the battery undergoes a process known as forming, which lasts from 2-4 weeks. During forming, if a Li-ion battery is cycled, it will lead to a significant loss in reversible capacity. The electrochemical stability of cathodes derived from lignosulfonate is far superior compared to their Li-ion counterparts. The present embodiment can therefore significantly reduce the cost of battery pre-processing steps (forming, degassing) and accelerate through-put. Among other next generation electrode materials, for example, silicon in Li-ion batteries and graphene-wrapped sulfur in Li—S batteries, the processes described herein are fully scalable. The improved electrochemical stability offers an opportunity for quick adoption of the technology in applications such as consumer and wearable electronics that require high energy densities and enhanced capacity retention. Eventually, owing to the performance attributes as well as ease of scalability, the present embodiment also offers an opportunity for integration in more intensive, large-scale applications such as grid storage or electric vehicles.

Figure 9:
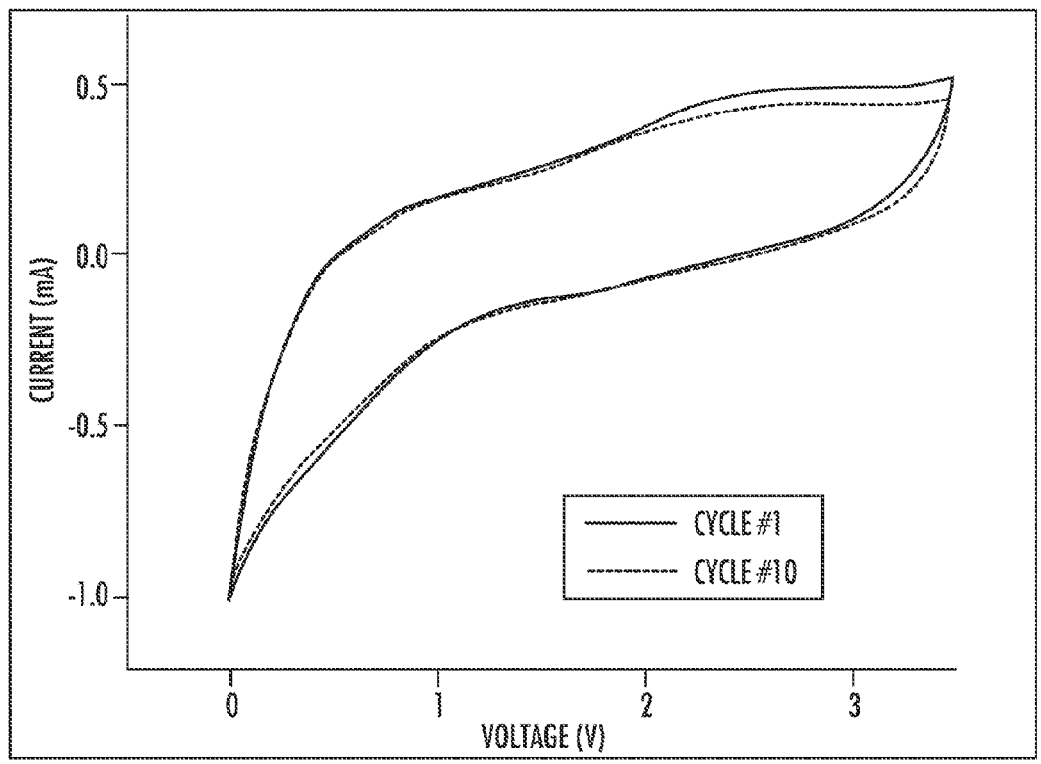
FIG. 9 depicts cyclic voltammetry profiles, conducted at a constant voltage sweep rate of 10 mV/s at the end of $1^{st}$ and $10^{th}$ charge-discharge cycles.

To this end, the cathodes of some embodiments may quickly attain a reversible capacity within the first ten cycles, as indicated by the cyclic voltammetry (CV) curve in FIG. 9. FIG. 9 depicts cyclic voltammetry profiles, conducted at a constant voltage sweep rate of 10 mV/s at the end of 1st and 10th charge-discharge cycles, for an Li—S battery half cell comprising a lithium foil vs. lignosulfonate cathode (lignosulfonate 80 wt %, PVDF 10 wt %, carbon black 10 wt %). The CV profiles display a negligible shift between the 1st and 10th cycles, indicating excellent electrochemical stability of the cathode. A greater shift in the CV profile, as commonly observed in Li-ion batteries that have not undergone the extensive forming step, indicates high irreversibility in the electrochemical interactions involving the electrode materials. A high cycle rate 100 mV/s was used here, resulting in only a small peak near 2.8 V.

Figure 10:
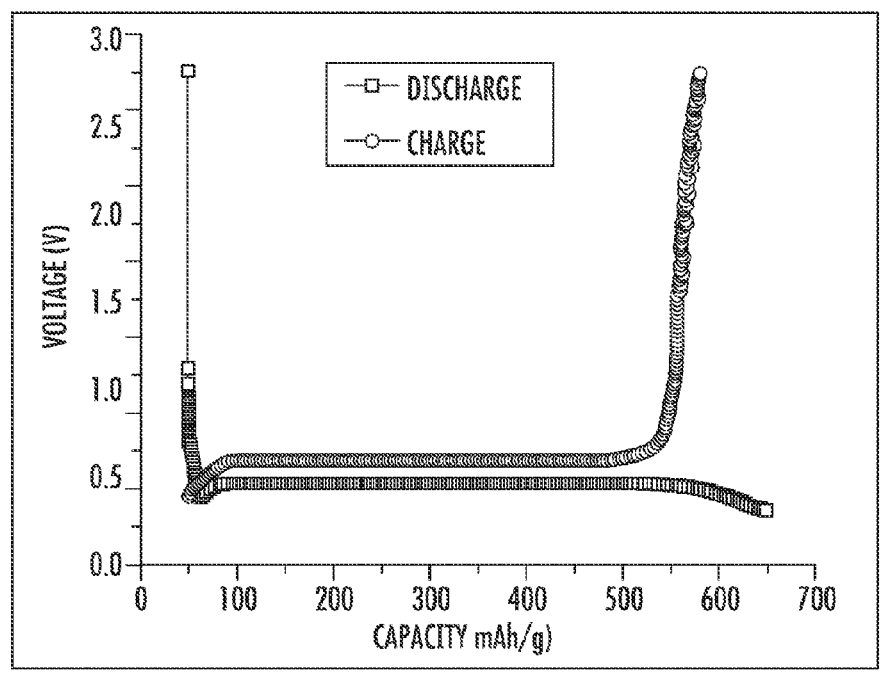
FIG. 10 depicts a typical voltage profile for a Li—S battery at a rate of 1° C., for a battery with a C—S cathode and a lithium foil as the anode.

The voltage window shown in FIG. 10 depicts a typical voltage profile for a Li—S battery half cell composed of a lithium foil vs. lignosulfonate cathode (lignosulfonate 80 wt %, PVDF 10 wt %, carbon black 10 wt %)e. FIG. 10 indicates an excellent battery profile for charge and discharge capacities, with a stable reaction potential at approximately 0.25 V, providing a net energy density in excess of 400 Wh/kg. For this battery, a discharge capacity of up to 600 mAh/g and a charge capacity of up to 600 mAh/g were observed.

The materials and methods of the embodiments yield a cathode material having a lower cost and twice the energy density of its Li-ion predecessors Batteries made from such cathode materials may be expected to have about half the per kWh cost, in line with the ambitious goals of the U.S. Department of Energy set for 2020.

Among the advantages of the embodiments are the high gravimetric capacity, abundance, and low cost of sulfur. Moreover, a rechargeable battery according to at least one embodiment exhibits reversible capacities in excess of 600 mAh/g, corresponding to an energy density of approximately 1300 Wh/kg, and Coulombic efficiencies greater than 99%. Additionally, inasmuch as the source of the raw material is essentially waste from the paper and pulp industry, the overall cost of material is considerably lowered. From environmental and economic perspectives, the embodiments described herein are both beneficial and promising for applications in the manufacturing, automotive and battery industries.

Further, the Li—S batteries of some embodiments may provide grid-storage power solutions. For example, Li—S batteries may power small to medium sized communities or provide back-up power during black-outs. In such implementations, the Li—S batteries may considerably ease the demands on coal and oil reserves that have escalated in recent years. Li—S batteries in grid-storage power may be particularly beneficial to emerging economies that are experiencing rapid grains in demand for electricity. Further, the high energy density of Li—S batteries makes them well-suited for integration in electric vehicles and hybrid electric vehicles. The cost savings discussed above, as attained in the Li—S battery manufacturing process, may extend to the overall cost of the battery packs of electric vehicles, and therefore may help to bring down the price of the vehicles themselves.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. Therefore, the above embodiments should not be taken as limiting the scope of the invention.

What is claimed is:

1. A method of making a cathode, comprising:
   extracting lignosulfonate from brown liquor;
   pyrolyzing the lignosulfonate;
   carbonizing the pyrolyzed lignosulfonate to form a carbon-sulfur material; and
   forming the carbon-sulfur material into a cathode.

2. The method of claim 1, further comprising: annealing the carbon-sulfur material.

3. The method of claim 1, wherein the pyrolizing comprises dehydrating the lignosulfonate at 80° C.

4. The method of claim 1, wherein the carbon-sulfur material has a substantially homogeneous distribution of sulfur within a carbon matrix.

5. The method of claim 1, wherein the carbonizing comprises heating the pyrolyzed lignosulfonate to 300° C. at 20° C./min prior to maintaining an isothermal state for one hour.

6. The method of claim 2, wherein the carbonizing comprises heating the pyrolyzed lignosulfonate to 300° C. at 20° C./min prior to maintaining an isothermal state for one hour.

7. The method of claim 6, wherein the annealing comprises increasing the temperature from 300° C. to 800° C. at 20° C/min prior to maintaining an isothermal state for up to 8 hours.

8. The method of claim 1, wherein the carbonizing comprises:
   heating the pyrolyzed lignosulfonate to 300° C.,
   maintaining an isothermal state for one hour,
   heating the pyrolyzed lignosulfonate to 800° C.,
   maintaining an isothermal state for three hours,
   cooling the pyrolyzed lignosulfonate to 100° C., ramping the temperature up to 155° C. at 1° C./min, and holding the temperature at 155° C. for sixteen hours.

9. The method of claim 1, wherein the carbonizing yields a sulfuric powder.

10. The method of claim 1, further comprising forming a lithium sulfur battery comprising the formed cathode.

* * * * *